(12) United States Patent
Yang et al.

(10) Patent No.: US 9,515,738 B2
(45) Date of Patent: Dec. 6, 2016

(54) OPTICAL MODULE

(71) Applicants: Hisense Broadband MultiMedia Technologies Co., Ltd., Shandong (CN); Hisense USA Corporation, Suwanee, GA (US)

(72) Inventors: Sigeng Yang, Shandong (CN); Qisheng Zhao, Shandong (CN); Ming Li, Shandong (CN); Lei Lu, Shandong (CN); Dengshan Xue, Shandong (CN); Shijian Ben, Shandong (CN); Hongping Yan, Shandong (CN)

(73) Assignees: HISENSE BROADBAND MULTIMEDIA TECHNOLOGIES CO., LTD., Shandong (CN); HISENSE USA CORPORATION, Suwanee, GA (US)

( * ) Notice: Subject to any disclaimer, the term of this patent is extended or adjusted under 35 U.S.C. 154(b) by 302 days.

(21) Appl. No.: 14/231,264

(22) Filed: Mar. 31, 2014

(65) Prior Publication Data

US 2016/0142145 A1    May 19, 2016

(30) Foreign Application Priority Data

Dec. 17, 2013  (CN) .................... 2013 2 0833595 U
Dec. 30, 2013  (CN) .......................... 2013 1 0744417

(Continued)

(51) Int. Cl.
H04B 10/40    (2013.01)
H04B 10/50    (2013.01)
H04B 10/572   (2013.01)

(52) U.S. Cl.
CPC ............ H04B 10/40 (2013.01); H04B 10/506 (2013.01); H04B 10/572 (2013.01)

(58) Field of Classification Search
CPC ............ H04B 10/2503–10/2504; H04B 10/40; H04B 10/501–10/504; H04B 10/506; H04Q 2011/0081
See application file for complete search history.

(56) References Cited

U.S. PATENT DOCUMENTS 5,325,382 A * 6/1994 Emura ................ H01S 5/06256
                                              372/26
6,288,809 B1 * 9/2001 Touma .................. H04J 3/1694
                                              398/9

(Continued)

Primary Examiner — David Payne
Assistant Examiner — Casey Kretzer
(74) Attorney, Agent, or Firm — McDermott Will & Emery LLP

(57) ABSTRACT

The embodiments of this disclosure provide an optical module, which expands the network bandwidth, eases a problem on dynamic bandwidth allocation. The optical module comprises an optical transceiver assembly and a control circuit, wherein the optical transceiver assembly comprises a first optical emitter and a second optical emitter; the control circuit is configured to control the first optical emitter to generate an optical signal of a first waveband, and the first optical emitter is configured to emit the optical signal of the first waveband to a transmission optical fiber; or, the control circuit is configured to control the second optical emitter to generate an optical signal of a second waveband, and the second optical emitter is configured to emit the optical signal of the second waveband to the transmission optical fiber. This disclosure is applied to an optical module of a wavelength division multiplex passive optical network.

19 Claims, 14 Drawing Sheets

(30) Foreign Application Priority Data

Dec. 30, 2013 (CN) .................... 2013 2 0880251 U
Dec. 30, 2013 (CN) .................... 2013 2 0884019 U

(56) References Cited

U.S. PATENT DOCUMENTS

| | | | |
|---|---|---|---|
| 2006/0222365 A1* | 10/2006 | Jung | H04J 14/0226 398/72 |
| 2009/0086776 A1* | 4/2009 | Funada | H01S 5/4031 372/28 |
| 2012/0155864 A1* | 6/2012 | Pepeljugoski | H04B 10/6931 398/37 |
| 2015/0138533 A1* | 5/2015 | Bolles | G01J 3/427 356/51 |

\* cited by examiner

OPTICAL MODULE

CROSS REFERENCE TO RELATED APPLICATIONS

This application claims priority to Chinese Patent Application No. 201310744417.4 filed Dec. 30, 2013; Chinese Patent Application No. 201320884019.8 filed Dec. 30, 2013; Chinese Patent Application No. 201320880251.4 filed Dec. 30, 2013; and Chinese Patent Application No. 201320833595.X filed Dec. 17, 2013. The subject matter of each of these applications is incorporated herein by reference in entirety.

FIELD

The embodiment(s) of this disclosure generally relate(s) to the technical field of communications, particularly to an optical module.

BACKGROUND

In the present optical fiber communication systems, particularly in the field of access network, as the demands on high-definition videos, ultra-clear videos and other services are increased continuously, the bandwidth, provided by Ethernet Passive Optical Network (EPON, for short), Gigabit Passive Optical Network (GPON, for short) and other techniques applied in the field of access network currently, can not meet the demands of clients gradually.

SUMMARY

Each embodiment of this disclosure at least includes the following technical solutions.

In the first aspect, an optical module is provided, including an optical transceiver assembly and a control circuit, wherein:

the optical transceiver assembly includes a first optical emitter and a second optical emitter;

the control circuit is configured to control the first optical emitter to generate an optical signal of a first waveband, and the first optical emitter is configured to emit the optical signal of the first waveband to a transmission optical fiber; or, the control circuit is configured to control the second optical emitter to generate an optical signal of a second waveband, and the second optical emitter is configured to emit the optical signal of the second waveband to the transmission optical fiber.

With reference to the first aspect, in an implementation, the microcontroller outputs a reference current to the mirror current source, and then outputs a mirror current via the mirror current source; and, the microcontroller samples the mirror current, then control the stable output of the mirror current by adjusting the reference current, forms a constant bias current from the mirror current and then outputs the bias current to the optical emitters.

With reference to the first aspect, in another implementation, the optical transceiver assembly further includes an optical network interface, the optical axis of the first optical emitter being collinear with that of the optical network interface, the optical axis of the second optical emitter being perpendicular to that of the first optical emitter, a first beam splitter inclined relative to the optical axis of the first optical emitter being provided between the first optical emitter and the optical network interface, the second optical emitter being positioned on one side of the first beam splitter; the first beam splitter transmits the first optical signal emitted by the first optical emitter and reflects the optical signal emitted by the second optical emitter, the transmitted first optical signal and the reflected second optical signal being both radiated onto the optical network interface; wherein, in the optical network interface, an end face facing the first optical emitter and the optical axis of the first optical emitter form a preset angle, so that the invalid optical signals from the first optical signal and the second optical signal are reflected by the end face and then kept away from the first optical emitter and the second optical emitter.

BRIEF DESCRIPTION OF THE DRAWINGS

To describe the technical solutions as provided by the embodiments of this disclosure, the accompanying drawings to be used for describing the embodiments will be briefly introduced as below. Apparently, the accompanying drawings as described below show merely some embodiments of this disclosure. A person of ordinary skill in the art may obtain other drawings from these accompanying drawings without creative efforts.

FIG. 5b is a schematic circuit diagram of one embodiment of the optical emitter drive circuit as shown in FIG. 5a;

FIG. 5c is a schematic circuit diagram of yet another embodiment of the optical emitter drive circuit as shown in FIG. 5a;

DETAILED DESCRIPTION OF EMBODIMENTS

The technical solutions as provided by the embodiments of this disclosure will be described with reference to the accompanying drawings in this disclosure. Apparently, the embodiments described herein are merely part, but not all, of embodiments of this disclosure. Based on the embodiments of this disclosure, all other embodiments made by a person of ordinary skill in the art shall fall into the protection scope of this disclosure.

Figure 1:
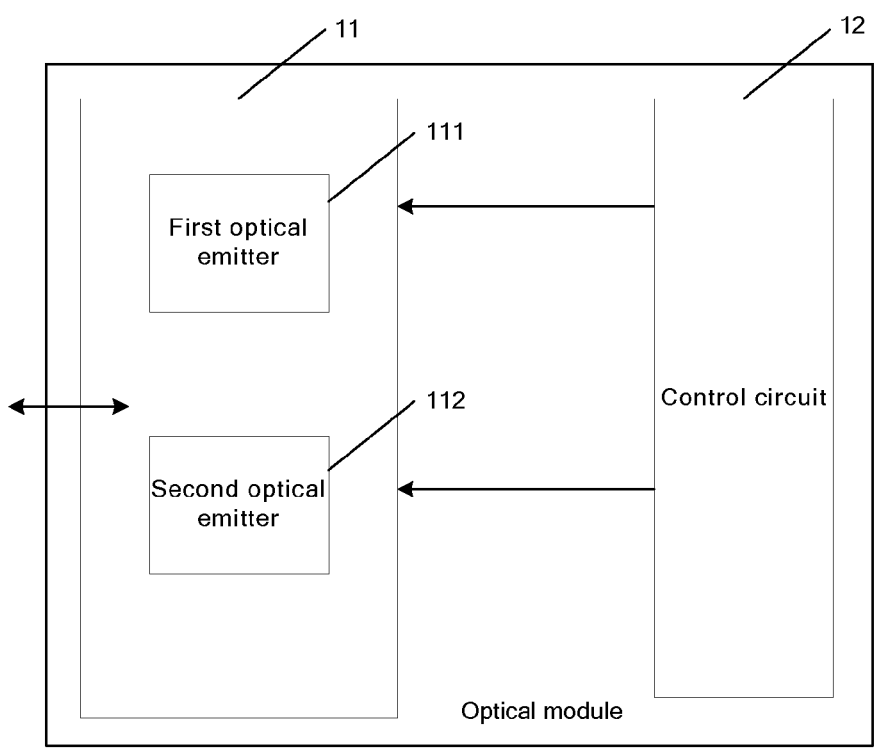
FIG. 1 is a structure diagram of an optical module according to an embodiment of this disclosure.

An embodiment of this disclosure provides an optical module. Referring to FIG. 1, the optical module includes an optical transceiver assembly 11 and a control circuit 12, wherein:

the optical transceiver assembly 11 includes a first optical emitter 111 and a second optical emitter 112;

the control circuit 12 is configured to control the first optical emitter 111 to generate an optical signal of a first waveband, and the first optical emitter 111 is configured to emit the optical signal of the first waveband to a transmission optical fiber;

or, the control circuit 12 is configured to control the second optical emitter 112 to generate an optical signal of a second waveband, and the second optical emitter 112 is configured to emit the optical signal of the second waveband to the transmission optical fiber.

It is to be noted that the optical signal of the first waveband and the optical signal of the second waveband have no crossed wavebands, so that the network bandwidth is expanded.

For the optical module as provided by the embodiments of this disclosure, by an optical module using a direct-modulation optical network unit having an optical transceiver assembly and a control circuit, the control circuit controls the optical transceiver assembly to generate an optical signal of the first waveband or the second waveband and then transmits the optical signal to the transmission optical fiber, so that the network bandwidth is expanded, and the problem on dynamic bandwidth allocation in the field of access network is eased. As the optical module provided by this embodiment may realize the transmission of optical signals of different wavebands in one device, compared with the case that the transmission of optical signals of different wavebands in the prior art needs different devices, that is, as optical module functions of two different wavebands are realized in one optical module, so that the cost of production and use is reduced. Meanwhile, as optical emitters of two wavebands are utilized, the number of paths of outputting optical signals is increased, and the number of users of optical network terminals is increased.

Figure 2:
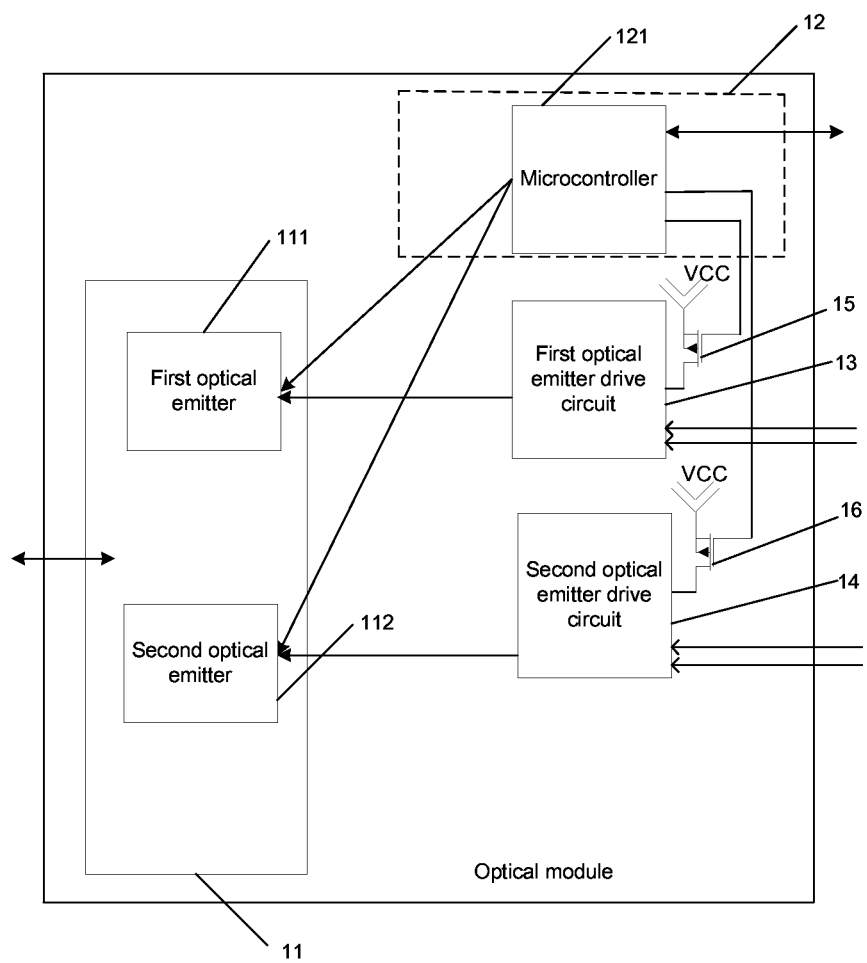
FIG. 2 is a structure diagram of another optical module according to an embodiment of this disclosure.

In another embodiment of optical module, referring to FIG. 2, the control circuit 12 includes a microcontroller 121, wherein:

the microcontroller 121 is configured to output a first configuration parameter matching with the optical signal of the first waveband to the first emitter 111; and/or the microcontroller 121 is further configured to output a second configuration parameter matching with the optical signal of the second waveband to the second emitter 112.

Wherein, the configuration parameters include phase region current and Distributed Bragg Reflection Grating Driver (DBR, for short) current.

The optical signal of the first waveband may be an optical signal of a C+ waveband. The wavelength of the optical signal of the C+ waveband may be 1559.72 nm-1547.74 nm, the signal interval may be 100 GHz, and there may be 16 paths of optical signals. The optical signal of the second waveband may be an optical signal of a C- waveband. The wavelength of the optical signal of the C- waveband may be 1545.32 nm-1533.47 nm, the signal interval may be 100 GHz, and there may be 16 paths of optical signals. Compared with the prior art, the optical module provided by this disclosure may realize the output of more paths (32 paths, i.e.) of optical signals, so that the number of users of the optical network terminal is increased, especially doubled relative to the prior art.

And in another embodiment, referring to FIG. 2, the optical module 1 further includes a first optical emitter drive circuit 13 and a first triode unit 15, wherein:

the grid of the first triode unit 15 is connected to the microcontroller 121, the source thereof is connected to a power supply, and the drain thereof is connected to the first optical emitter drive circuit 13;

the microcontroller 121 is configured to output a control signal to the grid of the first triode unit 15 to control on or off of the first triode unit 15, the first triode unit 15 being configured to turn on the power supply and the first optical emitter drive circuit 13 when turned on and turn off the first optical emitter drive circuit 13 when turned off, the power supply being configured to supply power to the first optical emitter drive circuit 13 when the first triode 15 is turned on in order to turn the first optical emitter drive circuit 13 on; and the first optical emitter drive circuit 13 is configured to output a first bias current to the first optical emitter 111 when in an on-state.

In another embodiment, referring to FIG. 2, the optical module 1 further includes a second optical emitter drive circuit 14 and a second triode unit 16, wherein:

the grid of the second triode unit 16 is connected to the microcontroller 121, the source thereof is connected to a power supply, and the drain thereof is connected to the second optical emitter drive circuit 14;

the microcontroller 121 is configured to output a control signal to the grid of the second triode unit 16 to control on or off of the second triode unit 16, the second triode unit 16 being configured to turn the power supply and the second optical emitter drive circuit 14 on when turned on and turn the second optical emitter drive circuit 14 off when turned off, the power supply being configured to supply power to the second optical emitter drive circuit 14 when the second triode unit 16 is turned on in order to turn the second optical emitter drive circuit 14 on; and the second optical emitter drive circuit 14 is configured to output a second bias current to the second optical emitter 112 when in an on-state.

Here, the bias current is input to an active region of an optical emitter. The optical emitters provided by the above embodiments could be tunable optical emitters including a DBR, a phase region (PASE) and an active region.

The first triode unit and the second triode unit may be realized by a voltage-controlled MOS field effect transistor, respectively. Certainly, the description herein just illustrates some elements of the first triode unit and the second triode. However, in practical applications, any triode capably of realizing the on-off function of the first triode unit and the second triode unit may be applicable.

Figure 3:
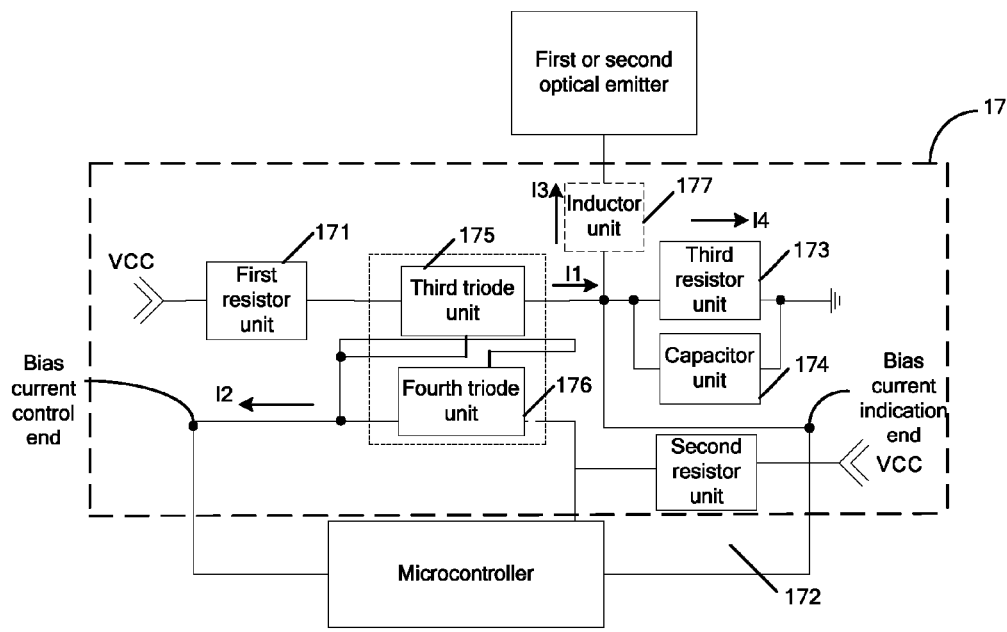
FIG. 3 is a structure diagram of a circuit for realizing the constant current control of the optical module according to an embodiment of this disclosure.

In another embodiment, referring to FIG. 2 and FIG. 3, the first optical emitter drive circuit 13 or the second optical emitter drive circuit 14 includes a bias current control circuit 17, wherein:

the bias current control circuit 17 is connected to the microcontroller 121 and the first optical emitter 111;

the bias current control circuit 17 is configured to receive a first bias control current output by the microcontroller 121, generate a mirror current of the first bias control current, and output a first component of the mirror current of the first bias control current to the first optical emitter 111 as the first bias current; and the microcontroller 121 is configured to monitor a second component of the mirror current of the first bias control current, and adjust the output value of the first bias control current according to the second component of the mirror current of the first bias current, thus to ensure the stable output of the first bias current;

or, the bias current control circuit 17 is connected to the microcontroller 121 and the second optical emitter 112;

the bias current control circuit 17 is configured to receive a second bias control current output by the microcontroller 121, generate a mirror current of the second bias control current, and output a first component of the mirror current of the second bias control current to the second optical emitter 112 as the second bias current; and the microcontroller 121 is configured to monitor a second component of the mirror current of the second bias control current, and adjust the output value of the second bias control current according to the second component of the mirror current of the second bias current, thus to ensure the stable output of the second bias current.

Wherein, in FIG. 3, a bias current control end and a bias current indication end serve as a connection node of the microcontroller 121 and the bias current control circuit 17, and the bias current control end serves as input of the first bias control current or the second bias control current.

Referring to FIG. 3, the bias current control circuit 17 includes a first resistor unit 171, a second resistor unit 172, a third resistor unit 173, a capacitor unit 174, a third triode unit 175 and a fourth triode unit 176, wherein the third triode unit 175 and the fourth triode unit 176 form a mirror current source, wherein:

one end of the first resistor unit 171 is connected to a power supply VCC, while the other end thereof is connected to the emitter of the third triode unit 175;

the base of the third triode unit 175 is connected to the collector and the base of the fourth triode unit 176, while the collector thereof is connected to one end of the third resistor unit 173 and the microcontroller 121;

the other end of the third resistor unit 173 is grounded; and the capacitor unit 174 is connected to the third resistor unit 173 in parallel.

One end of the capacitor unit 174 is connected to one end of the third resistor unit 173, while the other end thereof is connected to the other end of the third resistor unit 173;

the collector of the fourth triode unit 176 is connected to the microcontroller 121, while the emitter thereof is connected to one end of the second resistor unit 172;

the other end of the second resistor unit 172 is connected to the power supply VCC; and the collector of the third triode unit 175 is connected to the first optical emitter 111; or, the collector of the third triode unit 175 is connected to the second optical emitter 112.

Further, referring to FIG. 3, the bias current control circuit 17 further includes an inductor unit 177, wherein:

the inductor unit 177 is connected in serial between the collector of the third triode unit 175 and the first optical emitter 111 or the second optical emitter 112, wherein the inductor unit 177 is connected to the active region of the first optical emitter 111 or the second optical emitter 112.

It is to be noted that, each of the resistor units, the capacitor unit, the triode units and the inductor unit mentioned above may be realized by one or combination of more devices. That is, any one of the above resistor units may include at least one resistor. When any one of the above resistor units includes at least two resistors, the resistors in the resistor unit may be connected in parallel or in serial, and the resistance of the resistors may be constant or variable. The above capacitor unit may include at least one capacitor. When the above capacitor unit includes at least two capacitors, the capacitors in the capacitor unit may be connected in parallel or in serial, and the capacitance of the capacitors may be constant or variable; and each of the above triode units may include at least one triode. Certainly, the triode here should be a current-mode device having an amplification function.

Figure 4:
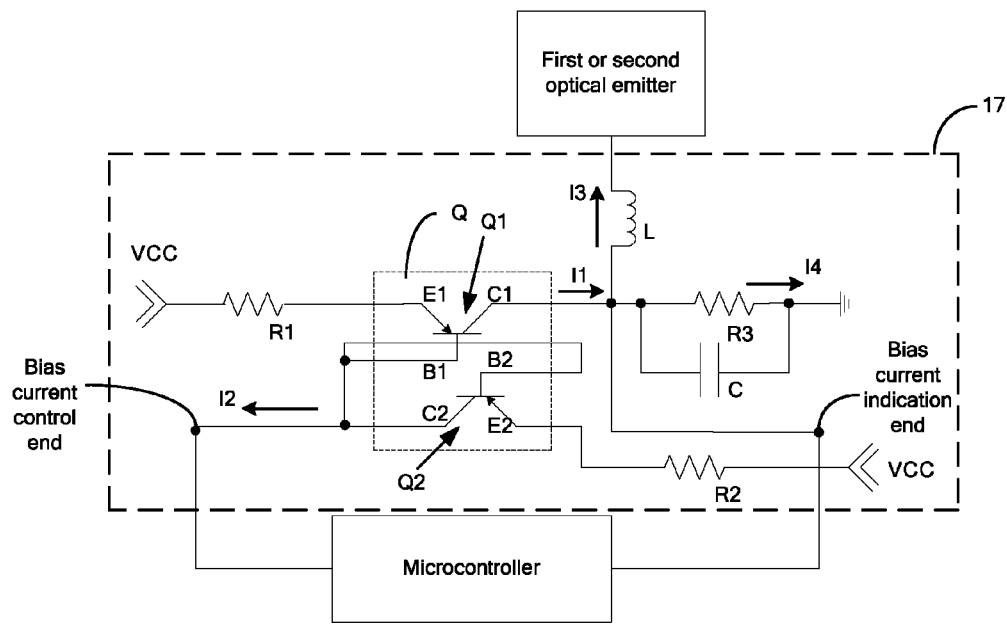
FIG. 4 is a structure diagram of another circuit for realizing the constant current control of the optical module according to an embodiment of this disclosure.

FIG. 4 of this disclosure is illustrated for instance that each unit of FIG. 3 is realized by only one device. For instance, the first resistor unit 171 includes a resistor R1 only, the second resistor unit 171 includes a resistor R2 only, the third resistor unit 173 includes a resistor R3 only, the third triode unit 175 includes a triode Q1 only, the fourth triode unit 176 includes a triode Q2 only, and the capacitor unit 174 includes a capacitor C only, the connection relationship between components in the DBR current control circuit will be described.

For instance, a bias current required by the first optical emitter or the second optical emitter for lighting is provided by a mirror current source Q (certainly, the mirror current source herein consists of the triode Q1 and the triode Q2, and the bias current herein is the mirror current of the first bias current or the second bias current in the above embodiments). The ratio of the current I2 at the bias current control end to the bias current actually loaded onto the first optical emitter or the second optical emitter is preset by presetting the resistance ratio of R2 to R1. Supposed that the resistance of the second resistor R2 is 10Ω and the resistance of the first resistor R1 is 100Ω at this moment, the current I1 is 10 times of the current I2, where, I2 is a reference current and I1 is the mirror current of I2, I1=I2×10. Meanwhile, by analyzing the circuit structure, it is known that the mirror current I1 may be split into a first component I4 and a second component I3, that is, I1=I4+I3, I3=I1−I4=I2×10−I4, where, I3 is the current passing through the inductor L as the bias current, and I4 is the current passing through the resistor R3. Wherein, the value of I4 may be shown at the bias current indication end via an MCU, and the value of I2 may be shown at the bias current control end via the MCU, so that the magnitude of the bias current I3 loaded onto the first optical emitter or the second optical emitter may be obtained by calculation. If the bias current indication end monitors that the current value of I3 is less than a preset value of the optical module, the bias current control end will increase the current I2, so that I3 will increase due to the following equation: I3=I1−I4=I2×10−I4; on the contrary, if the bias current indication monitors that the current value of I3 is greater than a preset current value of the optical module, the bias current control end will decrease the current I2, so that I3 will decrease due to the following equation: I3=I1−I4=I2×10−I4. Finally, I3 is kept in a constant value. Meanwhile, when the current I3 changes, the inductor unit L will impede the change of the current I3, thereby avoiding the over-rapid change of the current I3 and further realizing the automatic constant-current control function of the optical module.

Figure 5A:
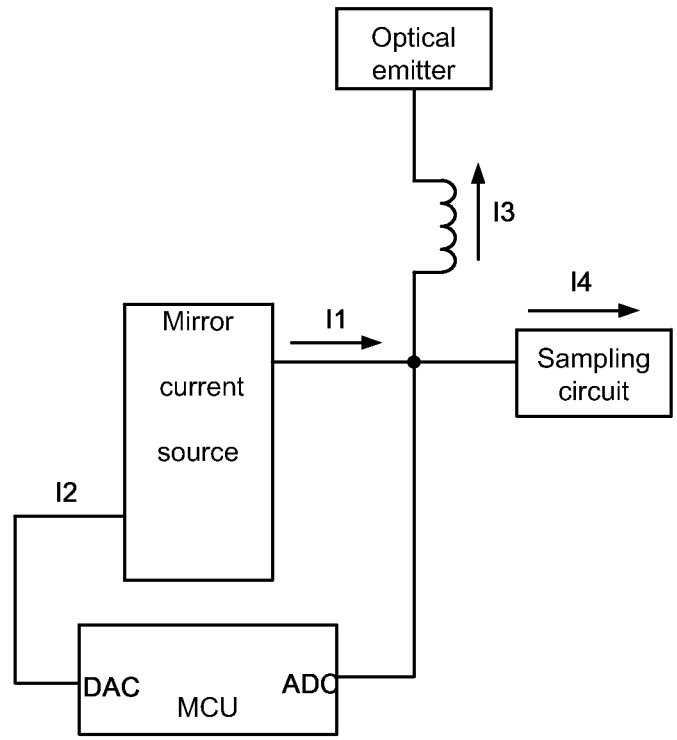
FIG. 5a is a schematic circuit diagram of an embodiment of an optical emitter drive circuit according to an embodiment of this disclosure.

The mirror current source may be formed by two transistors having completely consistent parameters (that is, the triode Q1 and the triode Q2 of FIG. 4 may be two transistors having consistent parameters). The transistors may be NPN triodes or PNP triodes. The microcontroller MCU provides a reference current I2 for one of the transistors in the mirror current source, so that the mirror current source generates a mirror current I1 (referring to FIG. 5a). The microcontroller MCU adjusts the magnitude of the reference current I2 by collecting the magnitude of the mirror current I1, the mirror current I1 can be further kept stable in a preset value, so that the purpose of controlling the stable output of the mirror current I1 is achieved. A constant working current is formed by the mirror current I1 and then output to loads, for example, the optical emitters in the optical module, thus to provide a constant bias current for the optical emitters. Therefore, the output wavelength of the optical emitters may be stabilized.

By sampling to detect the mirror current I1 via the microcontroller MCU, it may be known whether the mirror current I1 output by the mirror current source is stable. In one embodiment, an Analog to Digital Converter (ADC) interface of the microcontroller MCU may be connected to a pin of the mirror current source for outputting the mirror current I1, or a sampling circuit is connected to the pin of the mirror current source, so that the magnitude of the mirror current I1 may be calculated indirectly by detecting the sampling voltage of the sampling circuit.

To adjust the reference current I2, preferably, a Digital to Analog Converter (DAC) interface of the microcontroller MCU is connected to the mirror current source to transmit the reference current I2. When the microcontroller MCU detects that the mirror current I1 changes, a digital signal is generated and then converted into an analog signal by a DAC circuit in the microcontroller MCU, and then the reference current I2 is adjusted via the DAC interface. The output of the mirror current I1 is adjusted by changing the magnitude of the reference current I2, so that the mirror current I1 may be kept constant.

The configuration structure and the working principle of the optical emitter drive circuits will be described in details with reference to two cases, taking the optical emitter drive circuits applied in the optical module to provide a constant bias current for the optical emitters in the optical module as example.

Figure 5B:
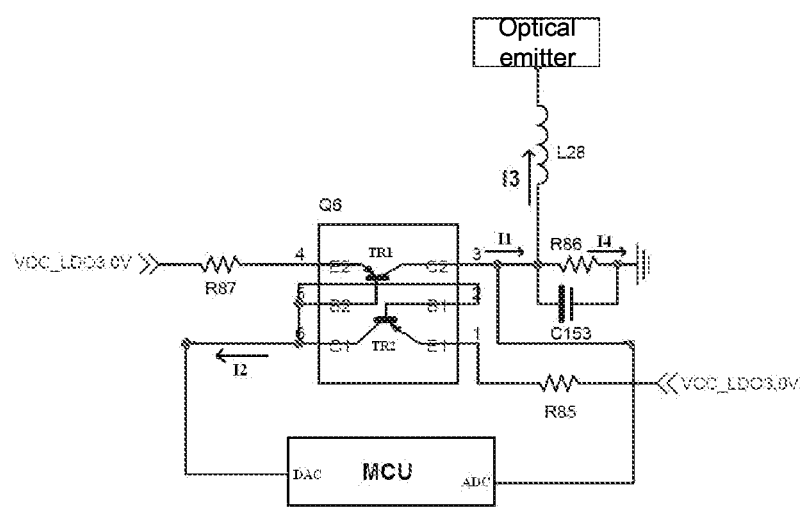

Referring to FIG. 5b, the mirror current source Q6 in this embodiment is described for instance that the mirror current source is formed by two PNP triodes TR1, TR2 having completely consistent parameters connected together. The bases of the two PNP triodes TR1, TR2 are butt-jointed, and the base of one of the triodes (for example, the triode TR2) is connected to its own collector to configure a diode. The emitter of the first PNP triode TR1 is connected to a direct-current power supply VCC_LDO3.0V via a first resistor R87. The direct-current power supply VCC_LDO3.0V may be a 3.0V direct-current power supply output stably by a constant-voltage chip. The collector outputs the mirror current I1 in order to provide a constant bias current for the optical emitters.

In this embodiment, to be convenient for sampling to detect whether the mirror current I1 is stable, the collector of the PNP triode TR1 in this embodiment is connected to a sampling circuit. For example, a sampling resistor R86 is selected to be connected between the collector of the PNP triode TR1 and the ground to convert a current signal into a voltage signal, so that it is convenient for the microcontroller MCU to sample. Two ends of the sampling resistor R86 may be further connected to a filter capacitor C153 in parallel to stabilize the sampling voltage. Meanwhile, the collector of the PNP triode TR1 is connected to an optical emitter via an inductor or a magnetic bead L28, thus to provide a bias current I3 for a light-emitting diode in the optical emitter and drive the light-emitting diode to emit laser. By using this circuit design, the mirror current I1 output by the collector of the first PNP triode TR1 is split into two paths: one path of current I4 passes through the sampling resistor R86, while the other path of current I3 passes through the inductor or magnetic bead L28 to form the bias current. The inductor or magnetic bead L28 in the circuit may filter the noise interference in the bias current I3, so that the interference resistance of the bias current I3 is improved.

An ADC interface of the microcontroller MCU is connected to the collector of the first PNP triode TR1 to collect the mirror current I1 output by the collector, or, connected to the sampling resistor R86 to collect the voltage value at two ends of the sampling resistor R86. Furthermore, the mirror current I1 or the voltage value is analog-to-digital converted by the ADC circuit in the microcontroller MCU to calculate the value of the current I4. Due to the equation of I1=I3+I4, and since I3 and I4 have a same trend of change, the change of the bias current I3 may be known by detecting the change of the current I4, and the bias current I3 may be stabilized indirectly by stabilizing the current I4.

The emitter of the second PNP triode TR2 in the mirror current source Q6 is connected to a direct-current power supply VCC_LDO3.0V via a second resistor R85, while the collector thereof is connected to the microcontroller MCU. For instance, the collector may be connected to a DAC interface of the microcontroller MCU. The current I2 (i.e., reference current) of the collector of the triode TR2 may be adjusted by the DAC interface of the microcontroller MCU.

The ratio of the mirror current I1 output from the collector of the first PNP triode TR1 to the reference current I2 may be adjusted by adjusting the resistance ratio of the first resistor R87 to the second resistor R85, i.e., $$I1 = \frac{R87}{R85} \times I2.$$

Given R85=10 ohm and R87=100 ohm, then I1=10×I2. Due to the equation of I1=I3+I4, I3=I1−I4=10×I2−I4 is established.

As the current I4 may be detected and the value thereof may be converted by the ADC interface of the microcontroller MCU, the value of the reference current I2 may be acquired by the DAC interface of the microcontroller MCU. In this way, the magnitude of the bias current I3 loaded onto an optical emitter may be known. If the microcontroller MCU detects that the reference current I4 is lower than a preset value, it is indicated that the bias current I3 drops. In this case, the microcontroller MCU may control the bias current I3 to rise by increasing the reference current I2. If the microcontroller MCU detects that the reference current I4 is higher than the preset value, it is indicated that the bias current I3 rises. In this case, the microcontroller MCU may control the bias current I3 to drop by decreasing the reference current I2. Therefore, the bias current I3 always remains constant, and the function of automatically controlling the bias current to be output constantly within a full temperature range is realized.

Figure 5C:
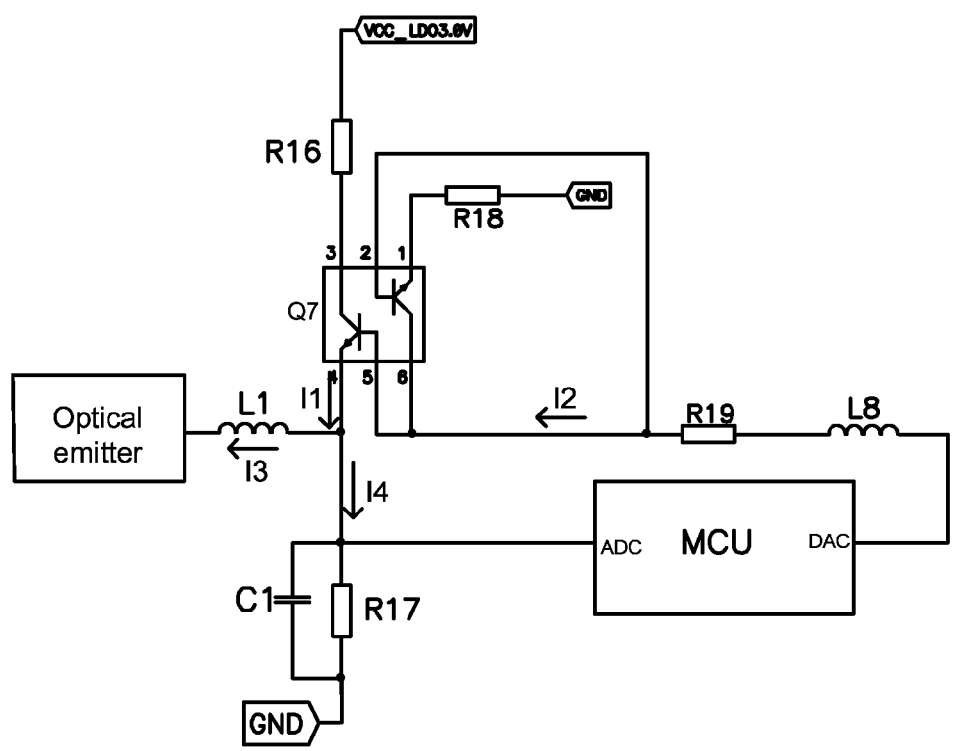

Referring to FIG. 5c, the mirror current source Q7 in this embodiment is illustrated for instance that the mirror current source is formed by two NPN triodes TR3, TR4 having completely consistent parameters connected together. The bases of the two NPN triodes TR3, TR4 are butt-jointed, and the base of one of the triodes (for example, the triode TR4) is connected to its own collector to configure a diode. The collector of the first NPN triode TR3 is connected to a direct-current power supply VCC_LDO3.0V via a third resistor R16, while the emitter thereof outputs the mirror current I1 for forming the bias current required by the optical emitters.

Similarly, the emitter of the first NPN triode TR3 is connected to a sampling circuit formed by a resistor R17 and a capacitor C1 connected in parallel, wherein the resistor R17 is configured to convert a current signal into a voltage signal and provide the voltage signal to a current detection terminal of the microcontroller MCU (for example, an ADC interface of the MCU) in order to monitor whether the bias current is stable in real time. The emitter of the NPN triode TR3 is connected to an optical emitter via an inductor or magnetic bead L1. The mirror current I1 output from the emitter of the NPN triode TR3 is split into a bias current I3 and a sampling current I4. Wherein, the bias current I3 flows through the inductor or magnetic bead L1 to filter the noise interference therein, and then is output to a light-emitting diode of the optical emitter, thus to provide a bias current for the light-emitting diode. The sampling current I4 flows through the resistor R17, and then is converted into a sampling voltage to be provided to the microcontroller MCU for monitoring.

The emitter of the second NPN triode TR4 in the mirror current source Q7 is grounded via a fourth resistor R18, while the collector thereof is connected to a regulation terminal of the microcontroller MCU (for example, a DAC interface of the MCU) via a fifth resistor R19 and an inductor L8 connected in serial. The microcontroller MCU controls the bias current I3 to be constant by adjusting the current I2 (i.e., the reference current) of the collector of the triode TR4.

The ratio of the mirror current I1 formed by the mirror current source Q7 to the reference current I2 may be adjusted by adjusting the resistance ratio of the third resistor R16 to the fourth resistor R18, that is, $$I1 = \frac{R18}{R16} \times I2.$$

Given R16=300 ohm and R18=3 K ohm, then I1=10×I2. Further, due to I1=I3+I4, I3=I1−I4=10×I2−I4. As the sampling current I4 may be detected and the value thereof may be converted by the ADC interface of the microcontroller MCU, the value of the reference current I2 may be acquired by the DAC interface of the microcontroller MCU. In this way, the magnitude of the bias current I3 loaded onto an optical emitter may be known. If the microcontroller MCU detects that the sampling current I4 is lower than a preset value, it is indicated that the bias current I3 drops. In this case, the microcontroller MCU may control the bias current I3 to rise by increasing the reference current I2. If the microcontroller MCU detects that the sampling current I4 is higher than the preset value, it is indicated that the bias current I3 rises. In this case, the microcontroller MCU may control the bias current I3 to drop by decreasing the reference current I2. Therefore, the bias current I3 always remains constant, the optical emitter TA may have a constant bias current in the full temperature range over the whole life cycle, and the problem of unstable output wavelength of the optical emitter TA caused by unstable bias current is eased.

Applied in the circuit structure design of the optical module, the optical emitter drive circuits provided by the above embodiments provide a constant bias current for the optical emitters in the optical module. Under the premise of improving the optical signal output stability of the optical emitters, as the output optical power of the optical module cannot be adjusted by a conventional automatic power control mode any more, that is, the output optical power of the optical module cannot remain constant by means of adjusting the bias current, in order to meet the design requirement on constant output optical power of the optical module, a constant-temperature control strategy may be employed in the above embodiment to keep the working temperature of the optical emitters constant all the time, thus to ensure the stability of the output optical power of the optical module.

Certainly, the constant bias current output from the optical emitter drive circuits provided by the above embodiment may also be applied to other electric loads in addition to the optical emitters, thus to supply power to the electric loads in need of receiving constant direct current and to meet the operational requirements of the electric loads.

The interior circuit structure diagram of the first optical emitter drive circuit 13 or the second optical emitter drive circuit 14 in the above embodiment may realize the function of automatically controlling the constant output of the bias current of the optical emitters within a full temperature range, so that the stable output of the bias current of the optical emitters within the full temperature range is ensured, meanwhile, the problem in the prior art that the output wavelength of the optical emitters is unstable due to the unstable output of the bias current of the optical emitters in an automatic power control mode (in the full temperature range over the whole life cycle, the output optical power remains constant while BIAS changes) is eased.

Figure 6:
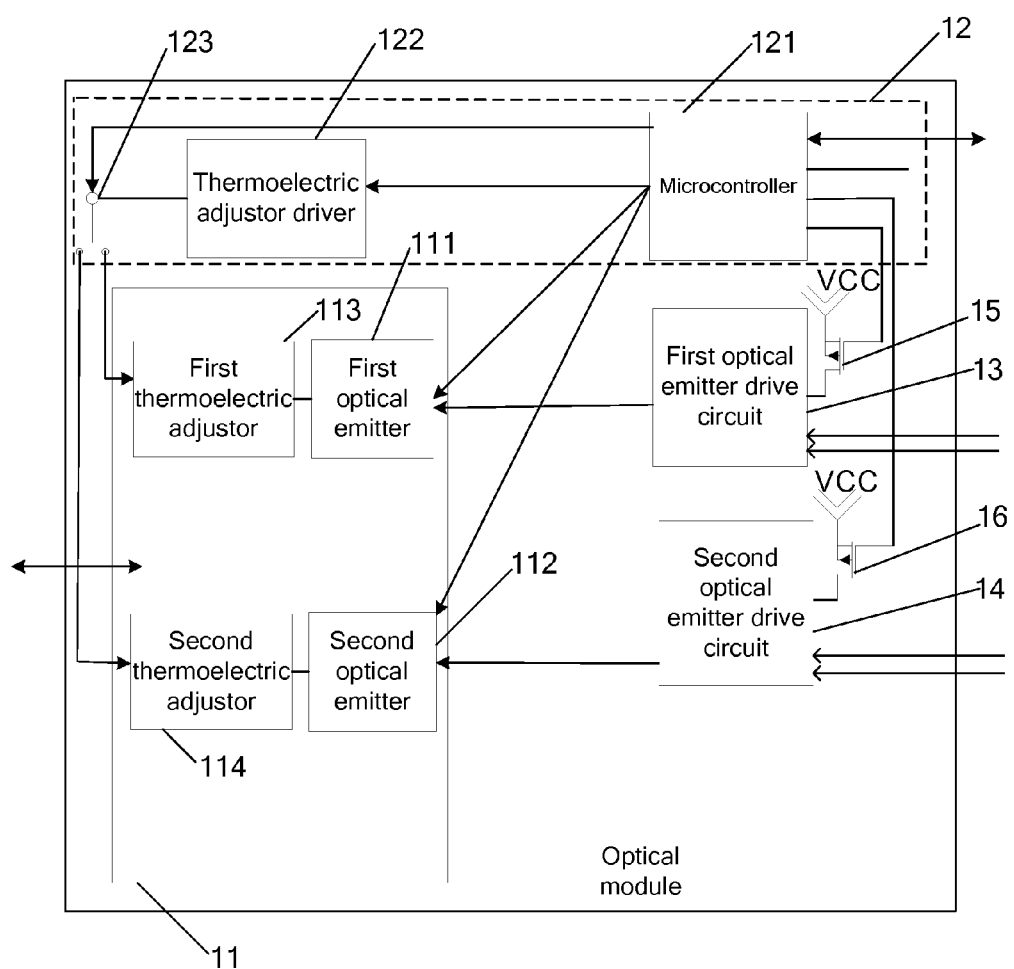
FIG. 6 is a structure diagram of still another optical module according to an embodiment of this disclosure.

Referring to FIG. 6, the control circuit 12 further includes a thermoelectric adjustor driver 122 and a first switch unit 123, and the optical transceiver assembly 11 further includes a first thermoelectric adjustor 113 and a second thermoelectric adjustor 114, wherein:

the microcontroller 121 is configured to control the first switch unit 123, and connect the thermoelectric adjustor driver 122 to the first thermoelectric adjustor 113 and the second thermoelectric adjustor 114 selectively;

the thermoelectric adjustor driver 122 is configured to drive the first thermoelectric adjustor 113 to generate a temperature-controlled drive current and input the temperature-controlled drive current to the first optical emitter 111;

or, the thermoelectric adjustor driver 122 is configured to drive the second thermoelectric adjustor 114 to generate a temperature-controlled drive current and input the temperature-controlled drive current to the second optical emitter 112.

Wherein, the thermoelectric adjustor driver 122 may control the temperature of the first optical emitter 111 and the second optical emitter 112 to remain within a constant range via the first thermoelectric adjustor 113 or the second thermoelectric adjustor 114.

The optical module in the above embodiment realizes a stable wavelength output. The first thermoelectric adjustor 113 is driven to input a temperature-controlled drive current into the first optical emitter 111 via the thermoelectric adjustor driver 122, or, the second thermoelectric adjustor 114 is driven to input a temperature-controlled drive current into the second optical emitter 112 via the thermoelectric adjustor driver 122. The optical module is required to output one wavelength only when in normal operation, so only one of the two optical emitters operates at a time. Therefore, in this embodiment, only one thermoelectric adjustor (the first thermoelectric adjustor 113 or the second thermoelectric adjustor 114) is used at a time, and the microcontroller 121 is used for controlling a single-pole double-throw switch 123 to hand over the current output of the thermoelectric adjustor driver 122 to the first thermoelectric adjustor 113 or the second thermoelectric adjustor 114. When an optical signal of the C+ waveband needs to be output, the current handed over by the thermoelectric adjustor driver 122 to drive the first thermoelectric adjustor 113 is loaded to the first optical emitter 111 of the C+ waveband, and the microcontroller 121 outputs to the DBR region and the phase region of the first optical emitter 111 a configuration parameter necessary for modulating the optical signal into the C+ waveband. Meanwhile, a control signal is input by the microcontroller 121 to the grid of the second triode unit 16 connected to the second optical emitter drive circuit 14 in order to turn the second triode 16 off, so that the power supply connected to the second optical emitter drive circuit 14 cannot supply power to the second optical emitter drive circuit 14, and the lighting function of the second optical emitter 112 is turned off while the first optical emitter 111 operates normally. When an optical signal of the C− waveband needs to be output, the current handed over by thermoelectric adjustor driver 122 to drive the second thermoelectric adjustor 114 is loaded to the second optical emitter 112 of the C− waveband, and the microcontroller 121 outputs to the DBR region and the phase region of the second optical emitter 112 a configuration parameter necessary for modulating the optical signal into the C− waveband. Meanwhile, a control signal is input by the microcontroller 121 to the grid of the first triode unit 15 connected to the first optical emitter drive circuit 13 in order to turn the first triode unit 15 off, so that the power supply connected to the first optical emitter drive circuit 13 cannot supply power to the first optical emitter drive circuit 13, and the lighting function of the first optical emitter 111 is turned off while the second optical emitter 112 operates normally.

Figure 7:
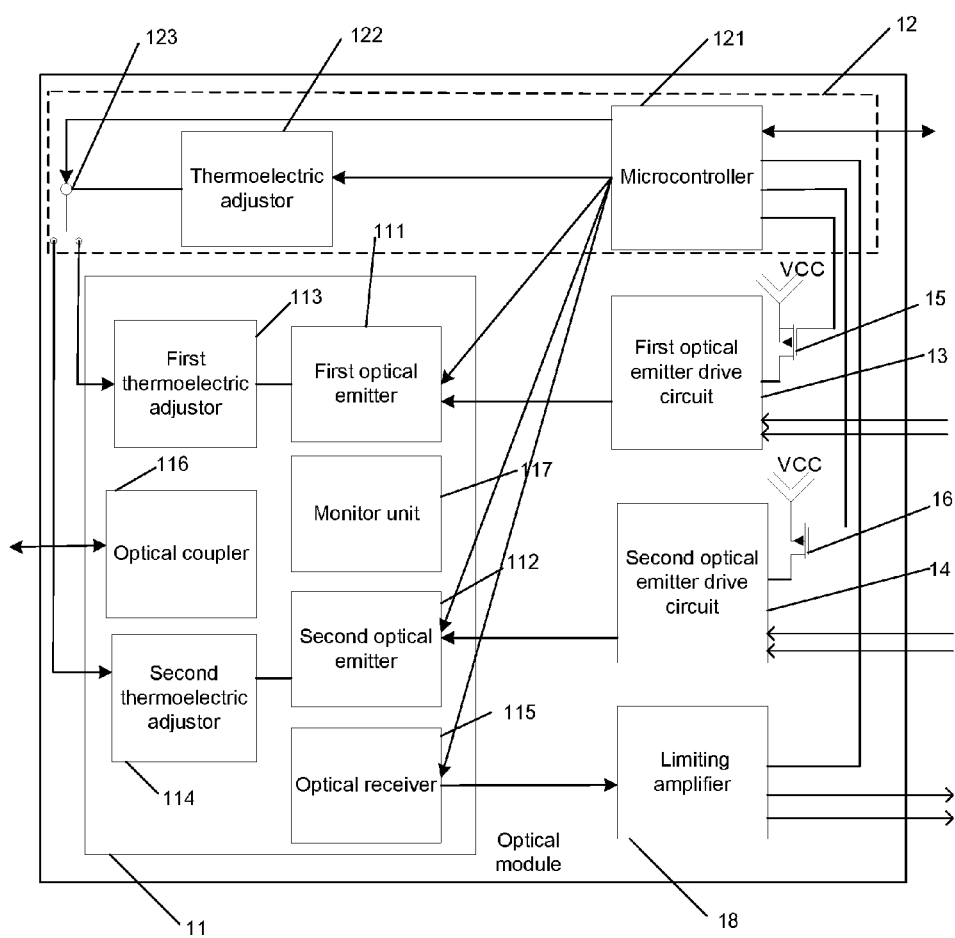
FIG. 7 is a structure diagram of further another optical module according to an embodiment of this disclosure.

In another embodiment, referring to FIG. 7, the optical transceiver assembly 11 further includes an optical receiver 115, wherein:

the optical receiver 115 is configured to receive an optical signal from the transmission optical fiber under the control of the control circuit 12 and convert the optical signal into a received electrical signal.

Optionally, referring to FIG. 7, the optical transceiver assembly 11 further includes an optical coupler 116 and a monitor unit 117, wherein:

the optical coupler 116 is configured to couple the optical signal of the first waveband generated by the first optical emitter 111 to the transmission optical fiber;

or, the optical coupler 116 is configured to couple the optical signal of the second waveband generated by the second optical emitter 112 to the transmission optical fiber;

or, the optical coupler 116 is configured to couple the optical signal received from the transmission optical fiber to the optical receiver.

The monitor unit 117 is configured to monitor the optical signals emitted by the first optical emitter 111 and the second optical emitter 112, and transmit the monitored information to the control circuit 12.

The monitor unit 117 may be a backlight detector. The backlight detector may be a Monitor Photodiode (MPD, for short). The optical transceiver assembly 11 is integrated with two backlight detectors for monitoring the optical signals emitted by the first optical emitter 111 and the second optical emitter 112 and transmitting the monitored information to the control circuit 12, respectively. When the monitor unit 117 herein is implemented by an MPD, the monitored information refers to the backlight current corresponding to the optical signals emitted by the first optical emitter 111 and the second optical emitter 112, and can indicate the value of instant power or light intensity of the transmitted optical signals, so that it is convenient for the control circuit 12 to instantly adjust configuration parameters to be input to the optical emitters according to the value of instant power or light intensity.

Further, referring to FIG. 7, the optical module 1 further includes a limiting amplifier 18, wherein:

the limiting amplifier 18 is configured to receive the received electrical signal transmitted by the optical receiver 115, and output the received electrical signal after amplitude limiting; and the limiting amplifier 18 is further configured to transmit a component of the received electrical signal to an analog monitoring apparatus for analog monitoring, and/or transmit the component of the received electrical signal to an analog-to-digital conversion apparatus for analog-to-digital conversion and then for digital monitoring.

Figure 8:
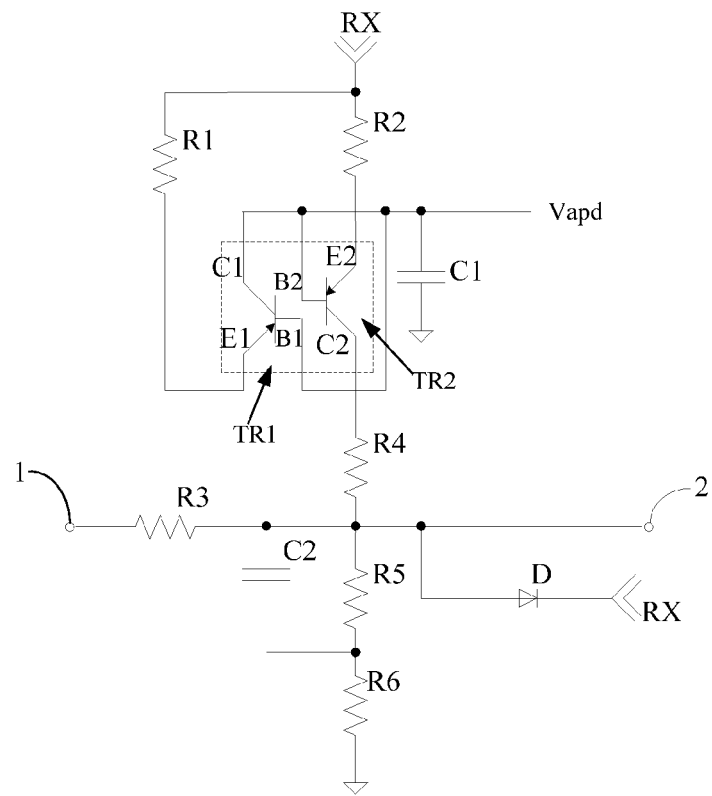
FIG. 8 is an interior structure diagram of a limiting amplifier of an optical module according to an embodiment of this disclosure.

The interior structure of the limiting amplifier 18 provided by this embodiment may refer to the structure as shown in FIG. 8, including a first resistor R1, a second resistor R2, a third resistor R3, a fourth resistor R4, a fifth resistor R5, a sixth resistor R6, a first capacitor C1, a second capacitor C2, a diode D, a first triode TR1, a second triode TR2, a received electrical signal monitoring and indication end 1, an analog-to-digital conversion indication end 2 and a monitoring voltage input end RX. One end of the first resistor R1 is connected to one end of the second resistor R2, while the other end thereof is connected to the emitter of the first triode TR1; the collector of the first triode TR1 is connected to the base of the second triode TR2, while the base thereof is connected to one end of the first capacitor C1; the base of the second triode TR2 is connected to one end of the first capacitor C1, the emitter thereof is connected to one end of the second resistor R2, and the collector thereof is connected to one end of the fourth resistor R4; the other end of the capacitor C1 is grounded; the other end of the second resistor R2 is connected to the monitoring voltage input end RX; one end of the third resistor R3 is connected to the received electrical signal monitoring and indication end 1, while the other end thereof is connected to one end of the second capacitor C2; the other end of the second capacitor C2 is connected to one end of the sixth resistor R6; the other end of the fourth resistor R4 is connected to one end of the fifth resistor; the other end of the fifth resistor is connected to one end of the sixth resistor; the other end of the sixth resistor is grounded; and, the anode of the diode D is connected to one end of the fifth resistor, while the cathode thereof is connected to the monitoring voltage input end RX. Wherein, the monitoring voltage input end RX is configured to receive the received electrical signal transmitted by the optical receiver, and then Vapd is output from one end of the first capacitor C1 after a limiting monitor performs amplitude limiting to the received electrical signal. Certainly, the circuit may further include IC chips of other functions to further process the Vapd voltage in order to obtain the required electrical signal. For example, the Vapd is converted into a symmetrically positive-negative voltage via a voltage-stabilizing circuit integrated IC chip for outputting.

Wherein, on the basis of original, the received electrical signal monitoring and indication end 1 and the analog-to-digital conversion indication end 2 are additionally provided in this disclosure, thus to transmit via the received electrical signal monitoring and indication end 1 a component of the received electrical signal to an analog monitoring apparatus for analog monitoring, and/or to transmit via the analog-to-digital conversion indication end 2 the component of the received electrical signal to an analog-to-digital conversion apparatus for analog-to-digital conversion and then for digital monitoring. As a result, the dual monitoring, i.e., analog monitoring and digital monitoring, to the amplitude of the received electrical signal is realized. Wherein, the received electrical signal monitoring and indication end 1 may be implemented in a form of SFF (Small Form Factor) encapsulated contact, for example, the first pin of the SFF contact. The external system of the optical module is collected by the first pin in real time, so that the analog monitoring to the received electrical signal is realized. For the analog-to-digital conversion indication end 2, monitoring may be performed via other pins. Certainly, when the microprogrammed control unit MCU has the function of analog-to-digital conversion, the component of the received electrical signal may be directly reported to the MCU to be analog-to-digital converted to obtain the actual optical power value, so that the digital monitoring to the received electrical signal is realized. In this way, the optical module may process the Received Signal Strength Indicator (RSSI, for short) according to actual needs. Wherein, provision of original analog signals is advantageous for the optical module to collect the most original signals, and the required processing operation may be performed. Meanwhile, if the analog signals are not collected, the digital quantity may be directly read from the optical module via a communication line.

Figure 9:
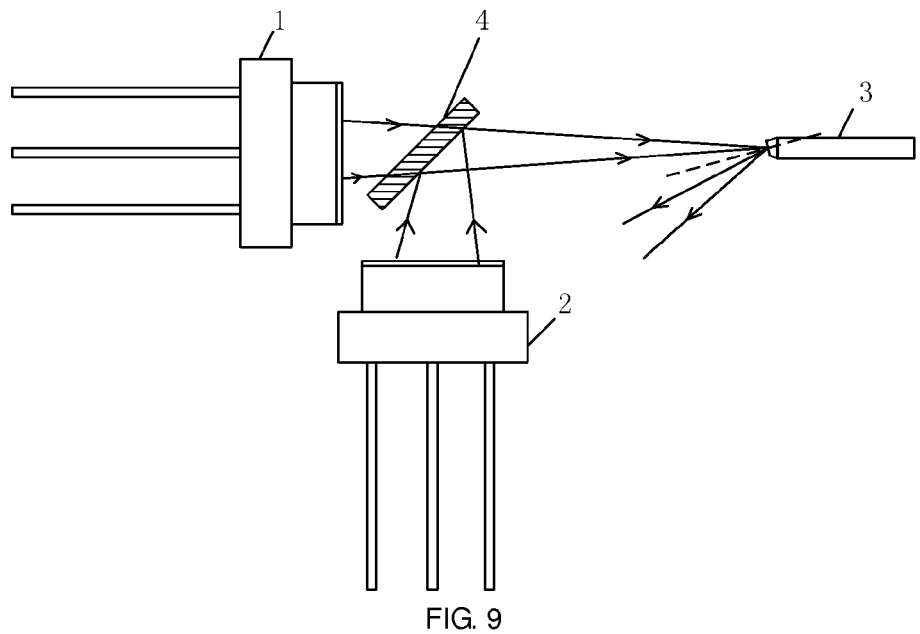
FIG. 9 is a structure diagram of an optical transceiver assembly according to an embodiment of this disclosure.

In addition, the optical transceiver assembly in the present application may further include an optical network interface 3, referring to FIG. 9.

Wherein, the optical axis of the first optical emitter 1 is collinear with that of the optical network interface 3, and the optical axis of the second optical emitter 2 is perpendicular to that of the first optical emitter 1. A first beam splitter 4 inclined relative to the optical axis of the first optical emitter 1 is provided between the first optical emitter 1 and the optical network interface 4. The second optical emitter 2 is positioned on one side of the first beam splitter 4.

The first beam splitter 4 transmits the first optical signal emitted by the first optical emitter 1 and reflects the optical signal emitted by the second optical emitter 2. The second optical signal reflected by the first beam splitter 4 and the first optical signal are both radiated onto the optical network interface 3.

In the art, a common optical network interface is of a cylindrical structure. The end face, facing the first optical emitter 1, of the optical network interface is an incident plane. This incident plane is perpendicular to the optical axis of the first optical emitter. The first optical signal emitted by the first optical emitter 1 and the optical signal emitted by the second optical emitter 2 are both radiated onto the incident plane of the optical network interface 3 in multiple beams in different incident angles. Majority of light is coupled into the optical fiber, called valid optical signals; while minority of light does not enter the optical fiber but dispersed around after reflected by the incident plane, called invalid optical signals. If the invalid optical signals enter the optical emitters, the luminescence of the optical emitters will be influenced.

Figure 10:
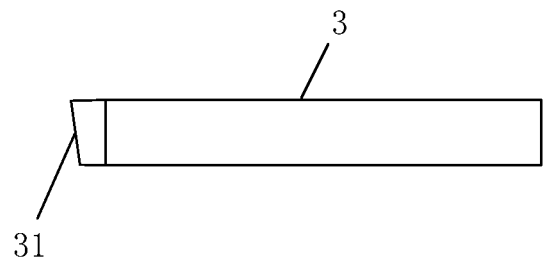
FIG. 10 is a structure diagram of an optical network interface in an optical transceiver assembly according to an embodiment of this disclosure.
Figure 11:
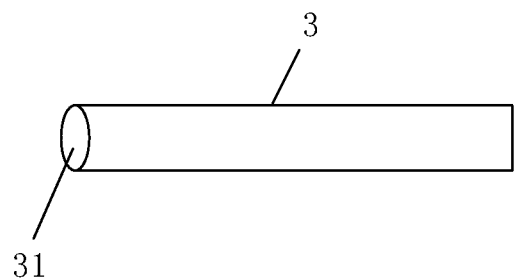
FIG. 11 is a top view of FIG. 10.

FIG. 10 is a structure diagram of an optical network interface in an optical transceiver assembly according to an embodiment of this disclosure, and FIG. 11 is a top view of the optical network interface. To prevent the invalid optical signals from entering the two optical emitters to influence the luminescence of the optical emitters, this embodiment provides a novel optical network interface 3, as shown in FIG. 10 and FIG. 11. An end face 31, facing the first optical emitter, of the optical network interface 3 and the optical axis of the first optical emitter 1 form a preset angle, so that the invalid optical signals from the first optical signal 1 and the second optical signal 2 are reflected by the end face 31 and then kept away from the first optical emitter 1 and the second optical emitter 2. That is, the propagation direction of the invalid optical signals will not be oriented towards the first optical signal 1 and the second optical signal 2, so that the invalid optical signals are prevented from entering first optical signal 1 and the second optical signal 2. In one embodiment, the structure of the optical network interface 3 may refer to FIG. 3. If the main body of the optical network interface 3 is a cylinder, the end face 31 thereof as the incident plane and the optical axis form a preset angle. That is, the end face 31 is elliptic.

Figure 12:
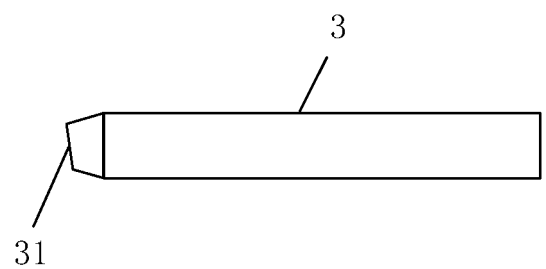
FIG. 12 is another structure diagram of the optical network interface in the optical transceiver assembly according to an embodiment of this disclosure.

In addition, one end, where the incident plane is located, in the optical network interface 3, may be cut to form a frustum having a preset angle between an upper bottom surface and a lower bottom surface. The upper bottom surface of the frustum is the end face 31, while the lower bottom surface thereof is a surface opposite to the end face 31, referring to FIG. 12. FIG. 12 is another structure diagram of the optical network interface in the optical transceiver assembly according to the present application.

The preset angle between the end face 31 of the optical network interface 31 and the optical axis of the first optical emitter 1 may be 81°-85°. The angle may be changed between 81°-85° according to the position of components in the optical transceiver assembly, like 81°, 83°, 85°, etc. In the optical transceiver assembly provided by this embodiment, the angle may be 82°. The optical network interface 3 may be a common device with an inclined angle of 8° in the prior art, that is, the device is disposed in the optical transceiver assembly with an angle of 82° between its incident plane and the optical axis of the first optical emitter 1; or, an existing cylindrical optical network interface 3 may be cut by technicians to form a structure having an inclined plane. The included angle between the inclined plane serving as the end face 31 and the optical axis of the first optical emitter 1 is 82°.

The angle of inclination of the first beam splitter 4 may be preset by a person skilled in the art, so that the first optical signal is radiated onto the optical network interface 3 after transmitted by the first beam splitter 4, and the second optical signal is also radiated onto the optical network interface 3 after reflected by the first beam splitter 4. In one example, the setup of the angle of inclination of the first beam splitter 4 may make the transmitted first optical signal and the reflected second optical signal radiated onto the optical network interface 3 after combining them together. That is, the paths of the first optical signal and the second optical signal are coincided.

The optical emitters provided by this embodiment may be multi-path optical signal optical emitters capable of emitting optical signals of various wavelengths, thus to provide multiple channels of optical signal transmission. For example, the first optical emitter 1 may be a 16-path optical emitter, and the second optical emitter 2 may also be a 16-path optical emitter, so the two optical emitters may provide 32 optical channels. The wavelength of the optical signals emitted by the first optical emitter 1 and the second optical emitter 2 may be preset within a different range, so that the application scope of the optical transceiver assembly is expanded. In one embodiment, the first optical signal emitted by the first optical emitter may be an optical signal of a C+ waveband, for example, an optical signal in wavelength from 1559.72 nm to 1547.74 nm. The emission interval of optical signals of different wavelengths may be 100 GHz. The second optical signal emitted by the second optical emitter 2 may be an optical signal of a C− waveband, for example, an optical signal in wavelength from 1545.32 nm to 1533.47 nm. The emission interval of optical signals of different wavelengths may be 100 GHz.

Figure 13:
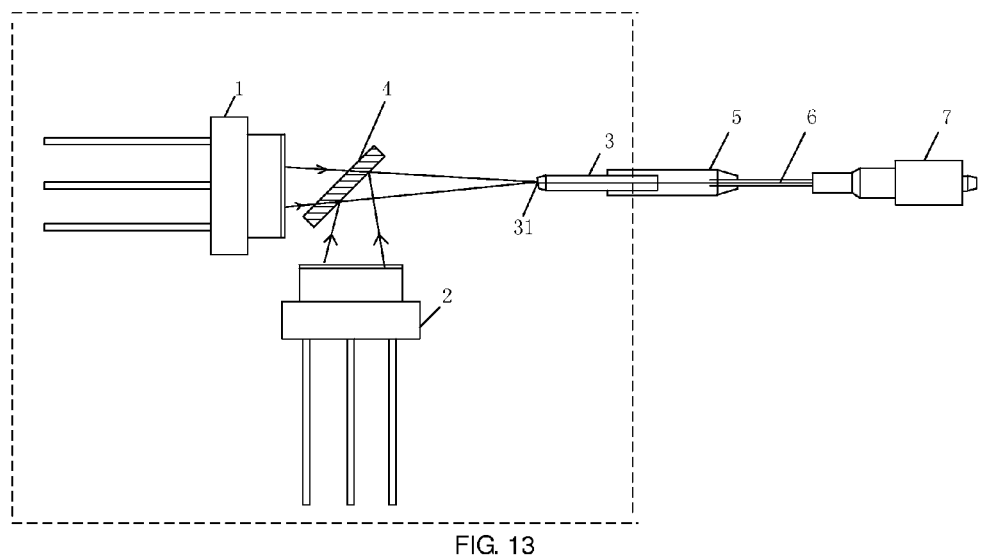
FIG. 13 is a structure diagram of connection of an optical transceiver assembly to an optical connector according to an embodiment of this disclosure.

FIG. 13 is a structure diagram of connection of an optical transceiver assembly to an optical connector according to an embodiment of the present application. As shown in FIG. 13, the above devices are encapsulated into a housing. A connection reinforcing element 5 is employed, one end of which is sheathed on the optical network interface 3, while the other end is connected to a pigtail 6. An optical fiber cladding is provided on the outside of the pigtail 6. The other end of the pigtail 6 is connected to an optical connector 7. In addition, the optical connector 7 may also be of a structure having an optical plane with an inclined angle of 8°, that is, an included angle between the end face of the optical connector 7 and the optical axis is 82°, so that the optical signals reflected by the optical network interface 3 can be further prevented from entering the two optical emitters.

By the technical solutions of this embodiment, an end face, facing the first optical emitter, of the optical network interface is preset to form a preset angle with the optical axis of the first optical emitter, so that the invalid optical signals in the first optical signal emitted by the first optical emitter and the second optical signal emitted by the second optical emitter are reflected by the end face and then kept away from the first optical emitter and the second optical emitter, thereby preventing the reflected light entering the first optical emitter and the second optical emitter again. By the technical solutions provided by this embodiment, the above effects may be achieved without any isolator, the number of optical devices is reduced, so that the difficulty in designing and installing the optical transceiver assembly is lowered, and the cost of design and manufacturing is also reduced.

In addition, the first beam splitter 4 in an optical transceiver assembly could be a thin-film Polarization Beam Splitter (PBS, for short). The first optical signal and the second optical signal are both radiated onto the incident plane of the first beam splitter 4 in a certain incident angle, so the first beam splitter 4 splits the first optical signal and the second optical signal into P light having a polarization direction parallel to the incident plane and S light having a polarization direction perpendicular to the incident plane, respectively.

The first beam splitter 4 may also be a crystal Polarization Beam Splitter (PBS), may include two prisms having cross sections of right triangles, wherein the inclined planes of the two prisms are fitted together, so that the two prisms form a cuboid. The fitting surfaces of the two prisms are coated with a polarizing film, respectively.

The first beam splitter 4 splits the first optical signal into P light having a polarization direction parallel to the incident plane and S light having a polarization direction perpendicular to the incident plane, and then transmits the P light and reflects the S light. The P light in the optical signal is transmitted by the first beam splitter 4 and then radiated onto the optical network interface 3. The first beam splitter 4 also splits the second optical signal into P light having a polarization direction parallel to the incident plane and S light having a polarization direction perpendicular to the incident plane, and then transmits the P light and reflects the S light. The S light in the second optical signal and the P light in the first optical signal are both radiated onto the optical network interface 3.

The two prisms in the first beam splitter 4 can be consistent in shape, and their cross sections are right triangles, in which the angle of two acute angles will not be limited in this embodiment and may be designed to be various angles by a person skilled in the art, so that the two prisms form a cuboid. Technicians may adjust the angle of inclination of the first beam splitter 4 according to the structure of the first beam splitter 4, so that the first optical signal is transmitted by the first beam splitter 4 and then radiated onto the optical network interface 3, and the second optical signal is reflected by the first beam splitter 4 and then radiated onto the optical network interface 3. As a preferred implementation of this embodiment, the cross sections of the two prisms in the first beam splitter 4 are isosceles right triangles, that is, two remaining acute angles in each triangle are both 45°, so that the two prisms form a cuboid. The two prisms in the first beam splitter 4 have cross sections of isosceles right triangles, so that both the design of the angle of inclination and the installation process of the first beam splitter 4 are simple, and the difficulty in design and installation is simplified.

In the above embodiments, a crystal PBS is used as the first beam splitter. The PBS includes two prisms having cross sections of right triangles. The inclined planes of the two prisms are fitted together, so that the structure of the first beam splitter may transmit the first optical signal emitted by the first optical emitter and reflect the second optical signal emitted by the second optical emitter. Compared with a thin-film PBS, the crystal PBS has good effects in transmitting and reflecting optical signals. The total transmission or total reflection is realized, so the loss of light is reduced. Consequently, the P light in the first optical signal and all S light in the second optical signal are radiated onto the optical network interface, so that the use ratio of light and light power are improved, and the transmission efficiency of the optical fiber communication is further improved. Furthermore, as the crystal PBS does not need a coating process requiring a quite high precision, the manufacturing process is simple and the cost is quite low, so that the complexity of manufacturing the optical transceiver assembly is lowered, and the manufacturing cost of the optical transceiver assembly is also reduced.

Figure 14:
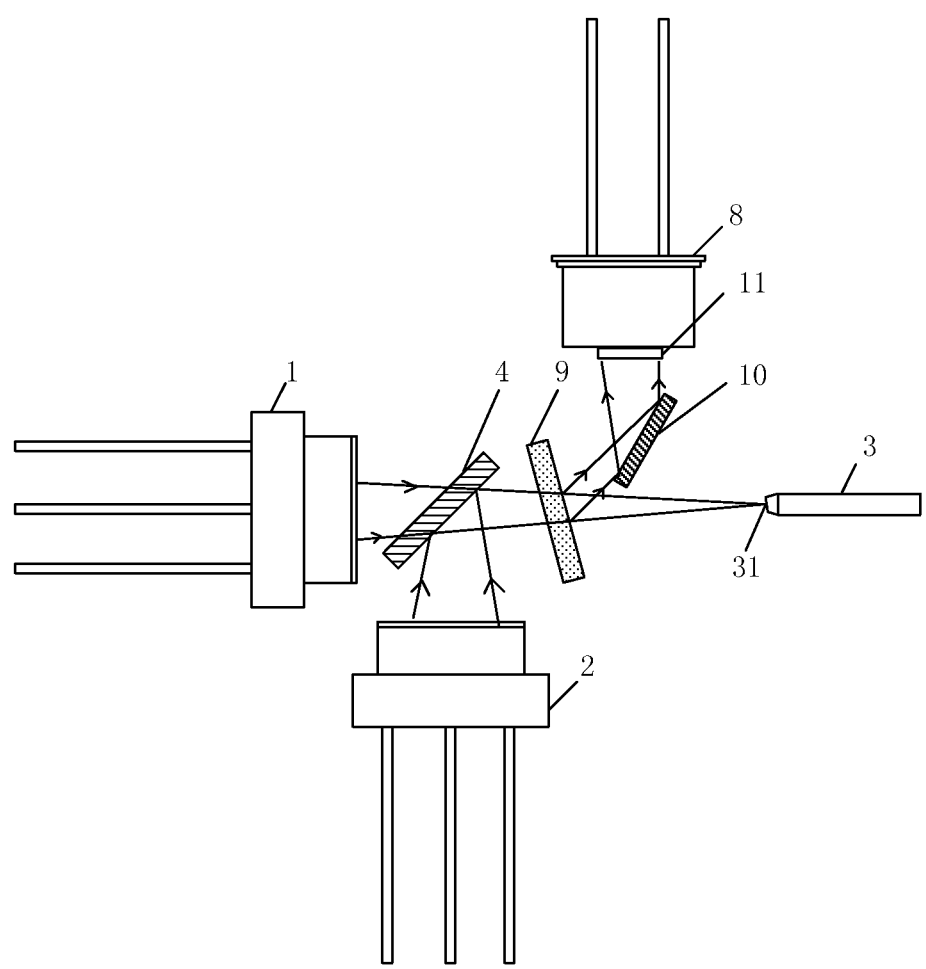
FIG. 14 is a structure diagram of an optical transceiver assembly according to yet another embodiment of this disclosure.

FIG. 14 is a structure diagram of an optical transceiver assembly according to another embodiment of the present application. The above embodiment has provided an optical transceiver assembly of a single-transmission optical signal. Based on the above embodiment, this embodiment provides an optical transceiver assembly for transmitting and receiving optical signals in two directions. As shown FIG. 14, the optical transceiver assembly further includes an optical receiver 8, a second beam splitter 9 and a light reflector 10. Wherein, the second beam splitter 9 is disposed between the first beam splitter 4 and the optical network interface 3 and inclined relative to the optical axis of the first optical emitter 1. The optical axis of the optical receiver 8 is perpendicular to that of the first optical emitter 1 and positioned between the second beam splitter 9 and the optical network interface 3. The light reflector 10 is disposed between the optical receiver 8 and the optical axis of the first optical emitter 1 and inclined relative to the optical axis of the optical receiver 8.

The first optical signal and the second optical signal are emitted from the first beam splitter 4 and then both radiated onto the second beam splitter 9. The second beam splitter 9 can transmit both the first optical signal and the second optical signal. The first optical signal and the second optical signal transmitted from the second beam splitter 9 are directly radiated onto the optical network interface 3 to enter the optical fiber to realize the transmission of the optical signals.

During the receiving of optical signals, the optical fiber in the optical network interface 3 receives a third optical signal from an optical network, and radiates the third optical signal onto the second beam splitter 9. The second beam splitter 9 can also reflect the third optical signal. In addition, the light reflector 10 is disposed, inclined relative to the optical axis of the optical receiver 8, at a light entrance of the optical receiver 8. The third optical signal is radiated onto the light reflector 10 after reflected by the second beam splitter 9. The light reflector 10 can reflect the third optical signal towards the optical receiver 8 to realize the reception of the optical signals.

The angle of inclination of the second beam splitter 9 and the angle of inclination of the light reflector 10 may be preset by a person skilled in the art, so that the first optical signal and the second optical signal are radiated onto the optical network interface 3 after transmitted, and the third optical signal is radiated onto the light reflector 10 after reflected by the second beam splitter 9 and then reflected towards the optical receiver 8 by the light reflector 10.

The third optical signal may be an optical signal of an L waveband, that is, an optical signal in wavelength from 1574 nm to 1616 nm.

The optical network interface 3 provided by the above embodiment may be applied to this embodiment. By presetting an end face 31, facing the first optical emitter 1, in the optical network interface 3 to form a preset angle with the optical axis of the first optical emitter 1, which may be 82°, the invalid signals in the first optical signal and the second optical signal are reflected by the end face 31 and then kept away from the first optical emitter 1 and the second optical emitter 2. Consequently, the reflected light is prevented from entering the first optical emitter 1 and the second optical emitter 2 again. The implementation process may refer to the above embodiment and will not be repeated here.

As the optical network interface provided by this embodiment may achieve the above effects without any isolator, the number of optical devices is reduced, the difficulty in designing and installing the optical transceiver assembly is lowered, and the cost of design and manufacturing may also be reduced.

Figure 15:
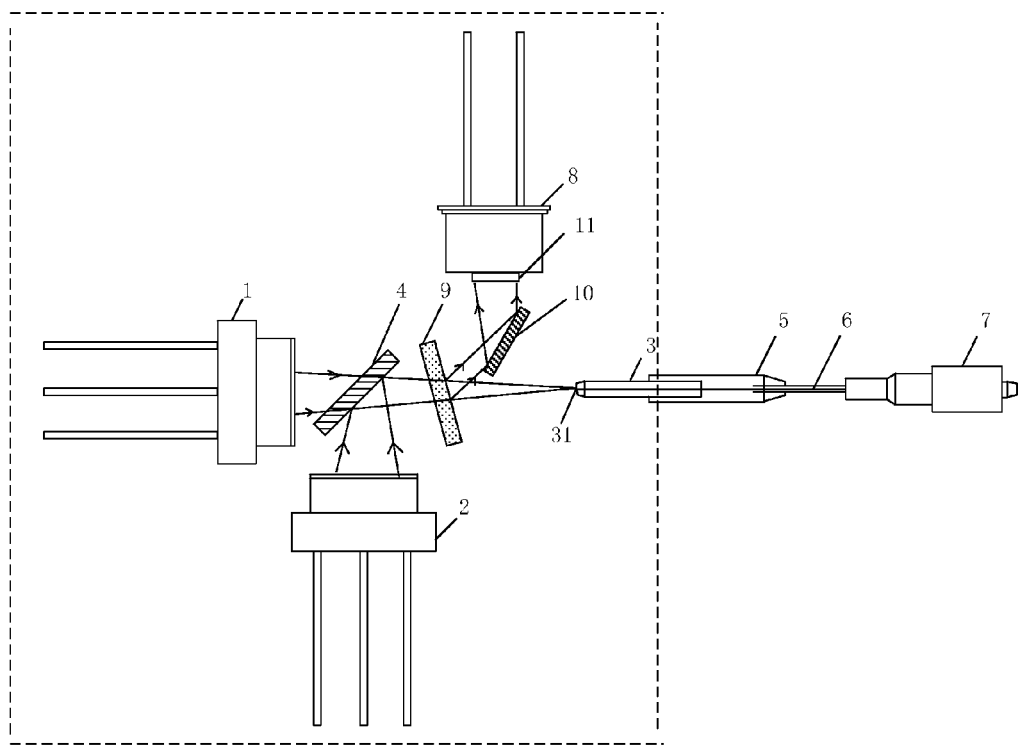
FIG. 15 is a structure diagram of connection of an optical transceiver assembly to an optical connector according to yet another embodiment of this disclosure.

In addition, FIG. 15 is a structure diagram of connection of an optical transceiver assembly to an optical connector according to another embodiment of the present application. As shown in FIG. 15, all components of the optical transceiver assembly provided by this embodiment are encapsulated into a housing. A connection reinforcing element 5 is employed, one end of which is sheathed on the optical network interface 3, while the other end is connected to a pigtail 6. An optical fiber cladding is provided on the outside of the pigtail 6. The other end of the pigtail 6 is connected to an optical connector 7. In addition, the optical connector 7 may also be of a structure having an optical plane with an inclined angle of 8°, so that the optical signals reflected by the optical network interface 3 can be further prevented from entering the two optical emitters.

Based on the above technical solution, an optical filter 11 may be provided between the optical receiver 8 and the light reflector 10. The optical axis of the optical filter 11 is collinear with that of the optical receiver 8. The optical filter 11 can transmit the third optical signal only, but reflect all other optical signals, for example, reflect the first optical signal, the second optical signal or other optical signals generated by diffuse reflection. As a result, the interference to light incident to the optical receiver 8 is avoided, and the precision of the optical transceiver assembly and the quality of optical fiber communication are improved.

Similarly, the optical transceiver assembly provided by this embodiment may also employ the structure of the first beam splitter as provided by the above embodiment, so that the use ratio of light and light power can be improved, and the transmission efficiency of optical fiber communication can be further improved. Furthermore, as the crystal PBS employed by the first beam splitter does not need a coating process requiring a quite high precision, the manufacturing process is simple, and the cost is low, so that the complexity of manufacturing the optical transceiver assembly is lowered, and the manufacturing cost of the optical transceiver assembly is also reduced. By the technical solutions of this embodiment, by presetting an end face, facing the first optical emitter, of the optical network interface to form a preset angle with the optical axis of the first optical emitter, the invalid optical signals in the first optical signal emitted by the first optical emitter and the second optical signal emitted by the second optical emitter are reflected by the end face and then kept away from the first optical emitter and the second optical emitter, thereby preventing the reflected light entering the first optical emitter and the second optical emitter again. By the technical solutions provided by this embodiment, the above effects may be achieved without any isolator, the number of optical devices is reduced, the difficulty in designing and installing the optical transceiver assembly is lowered, and the cost of design and manufacturing is also reduced.

Figure 16:
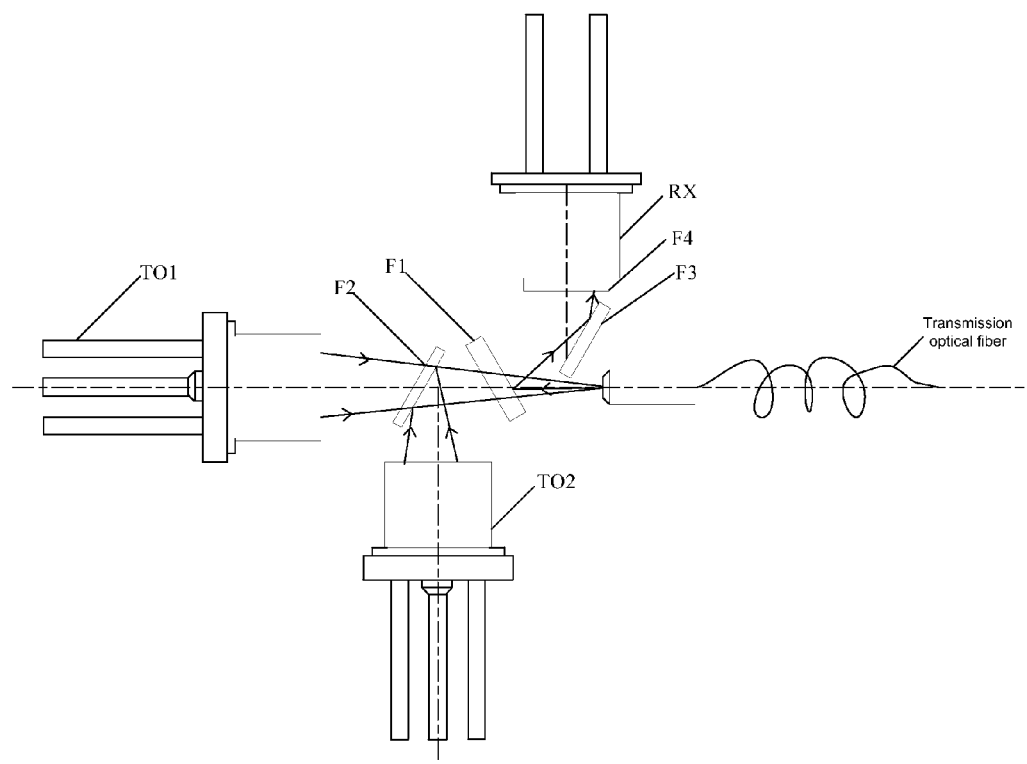
FIG. 16 is a structure diagram of a process of transmitting and receiving an optical signal via an optical coupler according to an embodiment of this disclosure.

In one embodiment, the first beam splitter, the second beam splitter, the light reflector and the optical fiber form an optical coupler, referring to FIG. 16, wherein the first beam splitter is a splitting filter F1, the second beam splitter is a combining filter F2, the light reflector is a reflecting filter F3, and the optical fiber is a zero-degree filter F4.

The first optical emitter TO1 and the second optical emitter TO2 transmit the emitted optical signals to a transmission optical fiber via the splitting filter F1 and the combining filter F2.

The optical receiver RX receives optical signals from the transmission optical fiber via the splitting filter F1, the reflecting filter F3 and the zero-degree filter F4.

The splitting filter F1 transmits optical signals in wavelength at a first waveband and a second waveband, and reflects optical signals of wavebands received in the transmission optical fiber. The splitting filter F1 is configured to send P-waveband optical signals in wavelength at the first waveband and the second waveband to the transmission optical fiber, and reflect the received optical signals in wavelength at an L waveband to the reflecting filter F3.

The combining filter F2 transmits the optical signal of wavebands of the TO1 and reflects the optical signal of the TO2. The combining filter F2 is configured to combine the optical signals emitted by the first optical emitter and the second optical emitter into P-waveband optical signals and then outputs them to the transmission optical fiber via the splitting filter F1.

The reflecting filter F3 reflects the optical signals received from the transmission optical fiber. The reflecting filter F3 is configured to send the received optical signals in wavelength at an L waveband back to the optical receiver RX.

The zero-degree filter F4 is disposed on the optical receiver RX and configured to isolate the optical signals emitted by the first optical emitter TO1 and the second optical emitter TO2 and other optical signals resulted from diffuse reflection, so that the influence of the first optical emitter TO1, the second optical emitter TO2 and other noise optical signals to the reception sensitivity of a receiving end is avoided.

The optical module provided by the above embodiment may use an SFF contact interface as a connection port of electrical signals, and may use a Square Connector/Angled Physical Connection (SC/APC, for short) as an optical signal interface.

By the above embodiment, the process of generating an optical signal of a first waveband by the first optical emitter and an optical signal of a second waveband by the second optical emitter and then transmitting the optical signals to a transmission optical fiber is realized. However, the optical module is mainly configured to transmit information. According to the prior art, the information to be transmitted is loaded onto the optical signals of the first waveband or the second waveband by an electro-optical modulation technique, so the external information to be transmitted may be received by the optical emitter drive circuits to form signals to be modulated. The signals to be modulated are then transmitted to corresponding optical emitters to be modulated to corresponding wavebands for transmitting.

In addition, the first optical emitter and/or the second optical emitter provided by the above embodiment may be further provided with a DBR region. A circuit board in the optical module is thereon formed with a DBR current control circuit for providing current to the DBR region. The DBR current control circuit includes a power supply, a microcontroller, a first resistor unit and a triode unit, wherein one end of the first resistor unit is connected to the power supply, while the other end thereof is connected to the collector of the triode unit; the first analog-to-digital converter and the second analog-to-digital converter of the microcontroller are connected to two ends of the first resistor unit, respectively, to collect the voltage at two ends of the first resistor unit; the pulse-width modulation pin of the microcontroller is connected to the base of the triode unit; and, the microcontroller is configured to control the current input to the base of the triode unit according to the voltage and further to control the DBR current output from the emitter.

Figure 17:
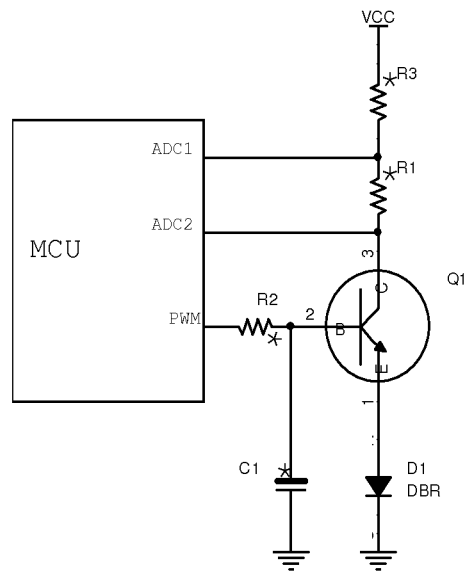
FIG. 17 is a schematic diagram of another DBR current control circuit according to an embodiment.

As an embodiment, the DBR current control circuit is as shown in FIG. 17. The first end of a resistor R3 is connected to a power supply Vcc, while the second end thereof is connected to the first end of a resistor R1. The second end of the resistor R1 is connected to the collector (C for short, i.e., 3 in FIG. 17) of a triode Q1. Meanwhile, the first end of the resistor R1 is connected to a first analog-to-digital converter (ADC for short, for example, ADC1 as shown in FIG. 17) of a Microprogrammed Control Unit (MCU for short; also known as microcontroller or singlechip), while the second end thereof is connected to a second analog-to-digital converter (ADC2) of the microprogrammed control unit. The first end of the resistor R2 is connected to a Pulse-Width Modulation (PWM, for short) pin of the microprogrammed control unit, while the second end thereof is connected to the base (B, for short, i.e., 2 in FIG. 17) of the triode Q1. The first end of a capacitor C1 is connected to the base of the triode Q1, while the second end thereof is connected to a ground point. The emitter (E, for short, i.e., 1 in FIG. 17) of the triode Q1 outputs the DBR current.

Wherein, the resistor R3 is mainly configured to adjust a circuit of inputting the power supply Vcc to the collector of the triode Q1 via R1, in order to ensure that the input voltage of the ADC1 will not exceed an upper input limit. The capacitor C1 is configured to keep the output stability of the PWM. The resistor R2 plays a role of current-limiting protection.

In one embodiment, two ends of the resistor R1 are input to the ADC1 and ADC2 of the MCU, respectively. Supposed that the voltage values of the ADC1 and ADC2 are Vadc1 and Vadc2, respectively, the current passing through R1 is IR1=(Vadc1−Vadc2)/R1, so that the current IR1 of R1 can be obtained via the microprogrammed control unit. When the triode Q1 is in an on-state, Ie=Ib+Ic. Due to $I_c=\beta I_b$, $I_e \approx I_c$. Hence, the current passing through the DBR is Idbr=Ie=Ic. When it is required to decrease Idbr, the output current of the PWM may be decreased to further decrease Ie and Ic, so that Idbr is decreased equivalently. Similarly, when the output current of the PWM is increased, Ie and Ic are increased further, so that the current passing through the DBR may be increased. Further, the MCU may monitor the magnitude of Idbr by monitoring Vadc1 and Vadc2, so that the precise control of the DBR current may be realized.

Figure 18:
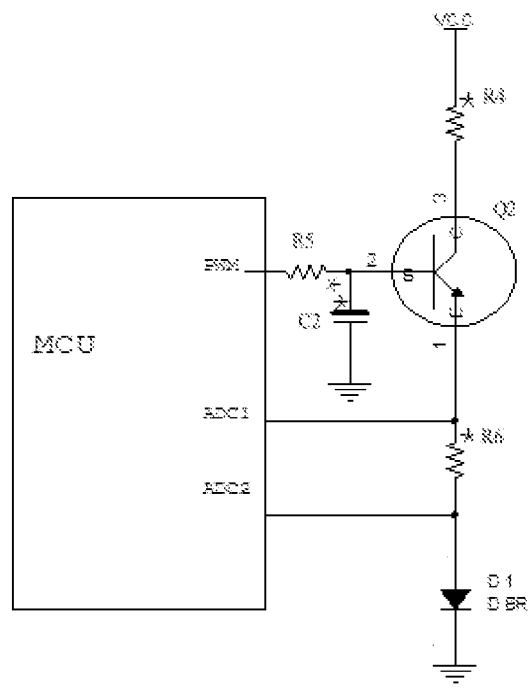
FIG. 18 is a schematic diagram of a DBR current control circuit according to another embodiment.

As another embodiment, the DBR current control circuit is shown in FIG. 18. As shown in FIG. 18, the first end of the resistor R4 is connected to the power supply Vcc, while the second end thereof is connected to the collector C (i.e., 3 in FIG. 18) of a triode Q2. The first end of the resistor R5 is connected to the Pulse-Width Modulation pin (PWM) of the microprogrammed control unit, while the second end thereof is connected to the base B (i.e., 2 in FIG. 18) of the triode Q2. The first end of the capacitor C2 is connected to the base of the triode Q2, while the second end thereof is connected to a ground point. The emitter E (i.e., 1 in FIG. 18) of the triode Q2 is connected to the first end of the resistor R6. The first pulse-width modulation pin ADC1 of the microprogrammed control unit is connected to the first end of the resistor R6, while the second pulse-width modulation pin ADC2 is connected to the second end of the resistor R6.

Wherein, the resistor R4 is mainly configured to adjust the current input to the collector of the triode Q2 by the power supply, in order to ensure the bias of the triode Q2. The capacitor C2 is configured to keep the output stability of the PWM. The resistor R5 plays a role of current-limiting protection.

It is to be noted that, the drive circuit of the DBR device as described in FIG. 17 and FIG. 18 is merely a structure diagram provided for convenient description of this embodiment. In FIG. 17 and FIG. 18, identifying the DBR device as a diode is done just for convenient description and writing. Any other DBR current control circuits having the above features shall fall into the protection scope of this embodiment.

It is to be noted that, the optical emitters may be laser devices in one embodiment. However, the optical emitters may be light-emitting diodes, composite structures thereof or any other devices capable of emitting light in other embodiments. The optical receivers may be detectors in one embodiment. However, the optical receivers may be photodiodes, composite structures thereof or any other devices capable of receiving light in other embodiments.

The optical module provided by this embodiment may be a direct-modulation optical module with 32 paths of light wave signals. Uplink signals and downlink signals of the optical module all are continuous signals, so that the complex control to uplink burst due to a time division multiplexing module is avoided, and it is more convenient and easier for production, application and maintenance.

In the optical module provided by the embodiments of this disclosure, by an optical module using a direct-modulation optical network unit having an optical transceiver assembly and a control circuit, the control circuit controls the optical transceiver assembly to generate an optical signal of the first waveband or the second waveband and then transmits the optical signal to the transmission optical fiber, so that the network bandwidth is expanded, and the problem on dynamic bandwidth allocation in the field of access network is eased. As the optical module provided by this embodiment may realize the transmission of optical signals of different wavebands in one device, compared with the case that the transmission of optical signals of different wavebands in the prior art needs different devices, that is, as optical module functions of two different wavebands are realized in one optical module, the cost of production and use is reduced. Meanwhile, as optical emitters of two wavebands are utilized, the number of paths of outputting optical signals is increased, and the number of users of the optical network terminals is increased.

It is to be noted that, the functions and/or effects of the embodiments of this disclosure mentioned above are merely part of functions and/effects to be achieved by the above embodiments. That is, other than the functions and/or effects mentioned above, other functions and/or effects may be further achieved by the above embodiments according to different application conditions and/or application scenarios of the above technical solutions, and will not be limited in this disclosure.

It should be appreciated by an ordinary person skilled in the art that all or a part of the steps of the foregoing embodiments may be implemented by hardware or a program instructing related hardware. The program may be stored in a computer readable storage medium. When the program is executed, the steps of the foregoing embodiments are executed. The storage medium may be a ROM, a RAM, a magnetic disk, an optical disk or other one medium capable of storing program codes.

In this disclosure, the terms "first" and "second" are only for the purpose of description, and should not be construed as indicating or implying relative importance; unless otherwise clearly defined and limited, the terms such as "mount", "connect" and "fix" should be understood in a broad sense, for example, the term "connect" may refer to a fixed connection, a detachable connection, or an integral connection. Persons of ordinary skill in the art can understand the meanings of the above terms in this disclosure according to specific circumstances.

The description above only illustrates some embodiments of this disclosure and thus does not intend to limit the scope thereof. Any change or replacement that may be thought by a person skilled in the art within the technical scope disclosed by this disclosure shall fall into the protection scope thereof. Any combination of the above embodiments of this disclosure shall fall into the protection scope thereof.

What is claimed is:

1. An optical module, the optical module comprises an optical transceiver assembly and a control circuit,
   the optical transceiver assembly comprises a first optical emitter and a second optical emitter;
   the control circuit is configured to control the first optical emitter to generate an optical signal of a first waveband, and the first optical emitter is configured to emit the optical signal of the first waveband to a transmission optical fiber;
   or,
   the control circuit is configured to control the second optical emitter to generate an optical signal of a second waveband, and the second optical emitter is configured to emit the optical signal of the second waveband to the transmission optical fiber;
   wherein the optical transceiver assembly further comprises an optical network interface, an optical axis of the first optical emitter being collinear with that of the optical network interface, an optical axis of the second optical emitter being perpendicular to that of the first optical emitter, a first beam splitter inclined relative to the optical axis of the first optical emitter being provided between the first optical emitter and the optical network interface, the second optical emitter being positioned on one side of the first beam splitter; the first beam splitter transmits the first optical signal emitted by the first optical emitter and reflects the optical signal transmitted by the second optical emitter, the transmitted first optical signal and the reflected second optical signal being both radiated onto the optical network interface; wherein, in the optical network interface, an end face facing the first optical emitter and the optical axis of the first optical emitter form a preset angle, so that invalid optical signals from the first optical signal and the second optical signal are reflected by the end face and then kept away from the first optical emitter and the second optical emitter.

2. The optical module according to claim 1, wherein the control circuit comprises a microcontroller;
   the microcontroller is configured to output a first configuration parameter matching with the optical signal of the first waveband to the first emitter;
   the microcontroller is further configured to output a second configuration parameter matching with the optical signal of the second waveband to the second emitter.

3. The optical module according to claim 2, wherein,
   the first configuration parameter and the second configuration parameter include phase region current and Distributed Bragg Reflection Grating Driver current.

4. The optical module according to claim 2, further comprising a first optical emitter drive circuit and a first triode unit, wherein:
   a grid of the first triode unit is connected to the microcontroller, a source thereof is connected to a power supply, and a drain thereof is connected to the first optical emitter drive circuit;
   the microcontroller is configured to output a control signal to the grid of the first triode unit to control on or off of the first triode unit, the first triode unit being configured to turn the power supply and the first optical emitter drive circuit on when turned on and turn the first optical emitter drive circuit off when turned off; the power supply is configured to supply power to the first optical emitter drive circuit when the first triode unit is turned on in order to turn the first optical emitter drive circuit on; and the first optical emitter drive circuit is configured to output a first bias current to the first optical emitter when in an on-state.

5. The optical module according to claim 4, wherein the first optical emitter drive circuit or the second optical emitter drive circuit comprises a bias current control circuit;

the bias current control circuit is connected to the microcontroller and the first optical emitter;

the bias current control circuit is configured to receive a first bias control current output by the microcontroller, generate a mirror current of the first bias control current, and output a first component of the mirror current of the first bias control current to the first optical emitter as the first bias current; and the microcontroller is configured to monitor a second component of the mirror current of the first bias control current, and adjust the output value of the first bias control current according to the second component of the mirror current of the first bias current, thus to ensure the stable output of the first bias current;

or, the bias current control circuit is connected to the microcontroller and the second optical emitter;

the bias current control circuit is configured to receive a second bias control current output by the microcontroller, generate a mirror current of the second bias control current, and output a first component of the mirror current of the second bias control current to the second optical emitter as the second bias current; and the microcontroller is configured to monitor a second component of the mirror current of the second bias control current, and adjust the output value of the second bias control current according to the second component of the mirror current of the second bias current, thus to ensure the stable output of the second bias current.

6. The optical module according to claim 5, wherein the bias current control circuit comprises a first resistor unit, a second resistor unit, a third resistor unit, a capacitor unit, a third triode unit and a fourth triode unit, the third triode unit and the fourth triode unit forming a mirror current source, wherein:

one end of the first resistor unit is connected to the power supply, while the other end thereof is connected to an emitter of the third triode unit;

the base of the third triode unit is connected to a collector and a base of the fourth triode unit, while a collector thereof is connected to one end of the third resistor unit and the microcontroller;

the other end of the third resistor unit is grounded;

the capacitor unit is connected to the third resistor unit in parallel;

a collector of the fourth triode unit is connected to the microcontroller, while an emitter of the fourth triode unit is connected to one end of the second resistor unit;

the other end of the second resistor unit is connected to the power supply; and the collector of the third triode unit is connected to the first optical emitter; or, the collector of the third triode unit is connected to the second optical emitter.

7. The optical module according to claim 6, wherein the microcontroller outputs a reference current to the mirror current source, and then outputs a mirror current via the mirror current source; and, the microcontroller samples the mirror current, then control the stable output of the mirror current by adjusting the reference current, forms a constant bias current from the mirror current and then outputs the bias current to the optical emitters.

8. The optical module according to claim 7, wherein the mirror current is split into two paths, one path being transmitted to a sampling circuit to form a sampling voltage, while the other path forming via an inductor or magnetic bead a bias current to be output to the optical emitter.

9. The optical module according to claim 8, wherein the sampling circuit consists of a resistor and a capacitor connected in parallel, and is connected between a pin of the mirror current source for outputting the mirror current and the ground; or, the controller is connected, via an Analog to Digital Converter (ADC) interface thereof, to a pin of the mirror current source for outputting the mirror current, or, receives the sampling voltage generated by the sampling circuit to perform sampling detection to the mirror current.

10. The optical module according to claim 6, wherein the bias current control circuit further comprises:

an inductor unit, connected in serial between the collector of the third triode unit and the first optical emitter or the second optical emitter.

11. The optical module according to claim 2, further comprising a second optical emitter drive circuit and a second triode unit, wherein:

a grid of the second triode unit is connected to the microcontroller, a source thereof is connected to a power supply, and a drain thereof is connected to the second optical emitter drive circuit;

the microcontroller is configured to output a control signal to the grid of the second triode unit to control on or off of the second triode unit, the second triode unit being configured to turn the power supply and the second optical emitter drive circuit on when turned on and turn the second optical emitter drive circuit off when turned off; the power supply is configured to supply power to the second optical emitter drive circuit when the second triode unit is turned on in order to turn on the second optical emitter drive circuit; and the second optical emitter drive circuit is configured to output a second bias current to the second optical emitter when in an on-state.

12. The optical module according to claim 2, wherein the control circuit further comprises a thermoelectric adjustor driver and a first switch unit, and the optical transceiver assembly further comprises a first thermoelectric adjustor and a second thermoelectric adjustor, wherein:

the microcontroller is configured to control the first switch unit, and connect the thermoelectric adjustor driver to the first thermoelectric adjustor and the second thermoelectric adjustor selectively;

the thermoelectric adjustor driver is configured to drive the first thermoelectric adjustor to generate a temperature-controlled drive current and input the temperature-controlled drive current to the first optical emitter;

or, the thermoelectric adjustor driver is configured to drive the second thermoelectric adjustor to generate a temperature-controlled drive current and input the temperature-controlled drive current to the second optical emitter.

13. The optical module according to claim 1, wherein the optical transceiver assembly further comprises an optical receiver, wherein:

the optical receiver is configured to receive, under the control of the control circuit, an optical signal in the transmission optical fiber and convert the optical signal into a received electrical signal.

14. The optical module according to claim 13, further comprising a limiting amplifier, the limiting amplifier is configured to receive a received electrical signal transmitted by the optical receiver, and output the received electrical signal after amplitude limiting; and the limiting amplifier is further configured to transmit a component of the received electrical signal to an analog monitoring apparatus for analog monitoring, and/or transmit the component of the received electrical signal to an analog-to-digital conversion apparatus for analog-to-digital conversion and then for digital monitoring.

15. The optical module according to claim 1, wherein the preset angle is in the range of 81°-85°.

16. The optical module according to claim 1, wherein the preset angle is 82°.

17. The optical module according to claim 1, wherein the first beam splitter is a crystal Polarization Beam Splitter; and the first beam splitter comprises two prisms having cross sections of right triangles, the inclined planes of the two prisms being fitted together.

18. The optical module according to claim 17, wherein the right triangles are isosceles right triangles.

19. The optical module according to claim 1, wherein the optical transceiver assembly further comprises an optical receiver, a second beam splitter and a light reflector;

the second beam splitter is disposed between the first beam splitter and the optical network interface and inclined relative to the optical axis of the first optical emitter, the second beam splitter transmitting the first optical signal and the second optical signal and reflecting a third optical signal from the optical fiber in the optical network interface towards the light reflector;

the optical axis of the optical receiver is perpendicular to that of the first optical emitter and positioned between the second beam splitter and the optical network interface; and the light reflector is disposed between the optical receiver and the optical axis of the first optical emitter and inclined relative to the optical axis of the optical receiver, the light reflector reflecting the third optical signal towards the optical receiver.

* * * * *